(12) United States Patent
Fujimoto et al.

(10) Patent No.: US 12,101,003 B2
(45) Date of Patent: Sep. 24, 2024

(54) MOTOR WITH INVERTER AND BUS BAR ARRANGEMENT

(71) Applicant: Nidec Corporation, Kyoto (JP)

(72) Inventors: Shohei Fujimoto, Kyoto (JP); Shuhei Nakamatsu, Kyoto (JP); Keigo Nakamura, Kyoto (JP); Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 371 days.

(21) Appl. No.: 17/602,370

(22) PCT Filed: Apr. 9, 2020

(86) PCT No.: PCT/JP2020/015926
§ 371 (c)(1),
(2) Date: Oct. 8, 2021

(87) PCT Pub. No.: WO2020/209324
PCT Pub. Date: Oct. 15, 2020

(65) Prior Publication Data
US 2022/0173641 A1  Jun. 2, 2022

(30) Foreign Application Priority Data

Apr. 11, 2019 (JP) ................................ 2019-075237
Jun. 13, 2019 (JP) ................................ 2019-110648

(51) Int. Cl.
*H02K 11/33* (2016.01)
*H02K 5/22* (2006.01)
*H02K 9/19* (2006.01)

(52) U.S. Cl.
CPC ............. *H02K 11/33* (2016.01); *H02K 5/225* (2013.01); *H02K 9/19* (2013.01)

(58) Field of Classification Search
CPC ........ H02K 11/33; H02K 11/30; H02K 11/04; H02K 11/05; H02K 5/22; H02K 5/225; H02K 9/19; H02K 9/193; H02K 9/197
(Continued)

(56) References Cited

U.S. PATENT DOCUMENTS 6,201,365 B1 * 3/2001 Hara .................... B60L 1/02
  903/952
2009/0251018 A1 * 10/2009 Koshida ................ H02K 5/225
  310/71
(Continued)

FOREIGN PATENT DOCUMENTS

JP 2001-119898 A 4/2001
JP 3886696 B2 2/2007
(Continued)

OTHER PUBLICATIONS

Machine translation of JP-2010105492-A. (Year: 2010).*
Official Communication issued in International Patent Application No. PCT/JP2020/015926, mailed on Jul. 14, 2020.

*Primary Examiner* — Michael Andrews
(74) *Attorney, Agent, or Firm* — Keating & Bennett, LLP

(57) ABSTRACT

A motor assembly includes a motor with a rotor rotatable about a motor shaft and a stator located radially outside the rotor, an inverter to supply power to the motor, a housing provided with a motor housing space that houses the motor and an inverter housing space that houses the inverter, and a first bus bar that electrically connects the motor and the inverter. The housing includes a partition wall portion that partitions the motor housing space and the inverter housing space and is provided with a through hole penetrating in the axial direction. The first bus bar is connected to a coil wire extending from the stator at an end on one side in the axial (Continued)

direction of the stator in the motor housing space, and extends to the inverter housing space through the through hole.

9 Claims, 14 Drawing Sheets

(58) Field of Classification Search
USPC .................................................. 310/52, 71
See application file for complete search history.

(56) References Cited

U.S. PATENT DOCUMENTS

2011/0065298 A1* 3/2011 Tanae .................... H02K 11/33
 439/189
2018/0090257 A1* 3/2018 Ishihara ................ H01F 27/306

FOREIGN PATENT DOCUMENTS

| JP | 2010105492 A * | 5/2010 |
| JP | 4951646 B2 | 6/2012 |
| JP | 2016-220385 A | 12/2016 |

* cited by examiner

MOTOR WITH INVERTER AND BUS BAR ARRANGEMENT

CROSS-REFERENCE TO RELATED APPLICATIONS

This is a U.S. national stage of application No. PCT/JP2020/015926, filed on Apr. 9, 2020, and with priority under 35 U.S.C. § 119(a) and 35 U.S.C. § 365(b) being claimed from Japanese Patent Application No. 2019-075237, filed on Apr. 11, 2019 and Japanese Patent Application No. 2019-110648, filed on Jun. 13, 2019, the disclosures of which are hereby incorporated herein by reference.

1. Field of the Invention

The present disclosure relates to a motor assembly.

2. Background

In recent years, a motor assembly including an inverter has been developed as a drive device for an electric vehicle. A driving device including a motor and an inverter disposed immediately above the motor is known.

In the conventional motor assembly, when the inverter is disposed in the radial direction of the motor, the motor and the inverter are connected by wiring (for example, a bus bar) extending radially outward from the motor. Since this wiring is located inside the housing, there is a problem that the routing work becomes complicated.

SUMMARY

One example embodiment of a motor assembly of the present disclosure includes a motor including a rotor rotatable about a motor axis and a stator located radially outside the rotor, an inverter to supply power to the motor, a housing provided with a motor housing space that houses the motor and an inverter housing space that houses the inverter, and a first bus bar that electrically connects the motor and the inverter. The housing includes a partition wall portion that partitions the motor housing space and the inverter housing space and is provided with a through hole penetrating in the axial direction. The first bus bar is connected to a coil wire extending from the stator at an end on one side in the axial direction of the stator in the motor housing space, and extends to the inverter housing space through the through hole.

The above and other elements, features, steps, characteristics and advantages of the present disclosure will become more apparent from the following detailed description of the example embodiments with reference to the attached drawings.

DETAILED DESCRIPTION

Figure 1:
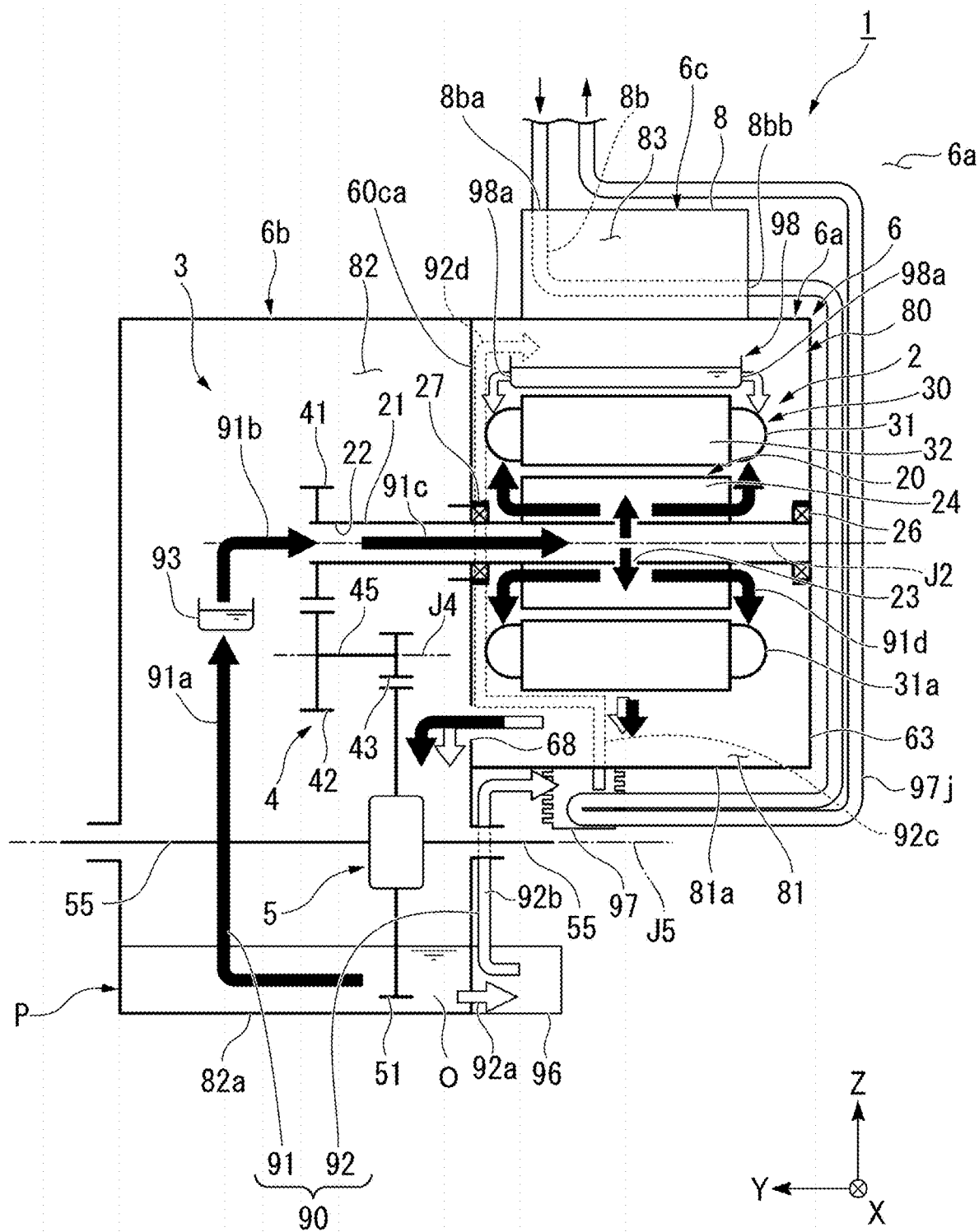
FIG. 1 is a conceptual diagram schematically illustrating a motor assembly according to one example embodiment of the present disclosure.

Hereinafter, motor assemblies according to example embodiments of the present disclosure will be described with reference to the accompanying drawings. Note that the scope of the present disclosure is not limited to the example embodiments described below, but includes any modification thereof within the scope of the technical ideas of the present disclosure.

The following description will be made with the direction of gravity being defined on the basis of positional relationships in the case where a motor assembly 1 is installed in a vehicle on a horizontal road surface. In addition, in the drawings, an xyz coordinate system is shown appropriately as a three-dimensional orthogonal coordinate system. In the xyz coordinate system, a z-axis direction corresponds to a vertical direction (i.e., an up-down direction), and a +z direction points upward (i.e., in a direction opposite to the direction of gravity), while a −z direction points downward (i.e., in the direction of gravity). In addition, an x-axis direction corresponds to a front-rear direction of the vehicle in which the motor assembly 1 is installed, and is a direction perpendicular to the z-axis direction, and a +x direction points forward of the vehicle, while a −x direction points rearward of the vehicle. The Y-axis direction is a direction orthogonal to both the X-axis direction and the Z-axis direction and indicates a width direction (left-right direction) of the vehicle, the +Y direction is a vehicle right direction, and the −Y direction is a vehicle left direction.

In the following description, unless otherwise specified, a direction (i.e., the Y-axis direction) parallel to a motor axis J2 of a motor 2 will be simply referred to by the term "axial direction", "axial", or "axially", radial directions centered on the motor axis J2 will be simply referred to by the term "radial direction", "radial", or "radially", and a circumferential direction centered on the motor axis J2, i.e., a circumferential direction about the motor axis J2, will be simply referred to by the term "circumferential direction", "circumferential", or "circumferentially".

In the example embodiment described below, the motor axis J2 extends in parallel with the vehicle. Therefore, in the following description, the axial direction is a direction parallel to the width direction of the vehicle. In the present specification, one side in the axial direction is a −Y side, and the other side in the axial direction is a +Y side.

Further, in the present specification, "extending along" in a predetermined direction (or plane) includes not only a case of extending strictly in a predetermined direction but also a case of extending in a direction inclined within a range of less than 45° with respect to the strict direction.

Hereinafter, a motor assembly 1 according to an example embodiment of the present disclosure will be described. The motor assembly 1 of the example embodiment is installed in a vehicle having a motor as a power source, such as, for example, a hybrid electric vehicle (HEV), a plug-in hybrid vehicle (PHV), or an electric vehicle (EV), and is used as the power source thereof. That is, the motor assembly 1 is a drive device.

Figure 2:
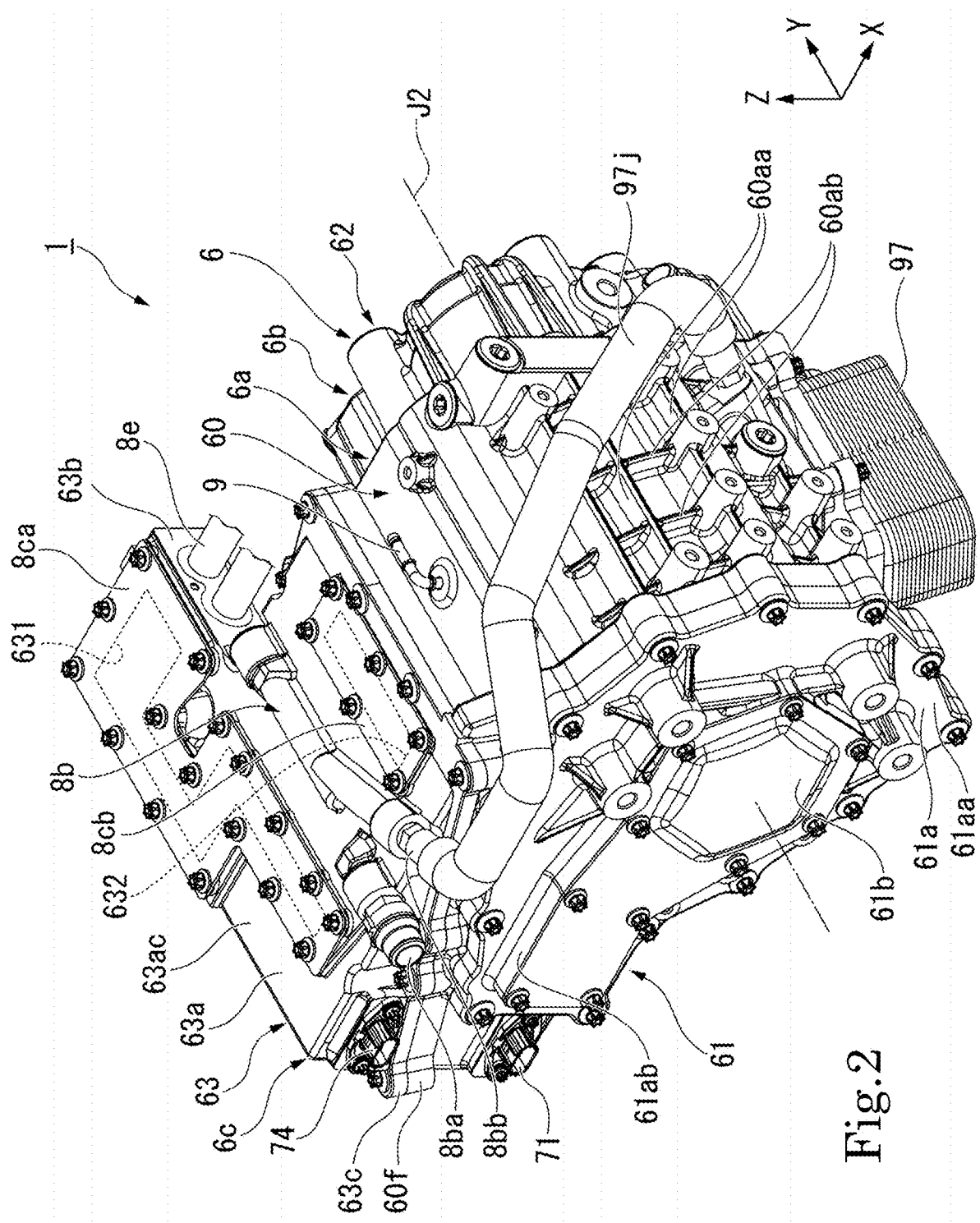
FIG. 2 is a perspective view of a motor assembly according to an example embodiment of the present disclosure.
Figure 3:
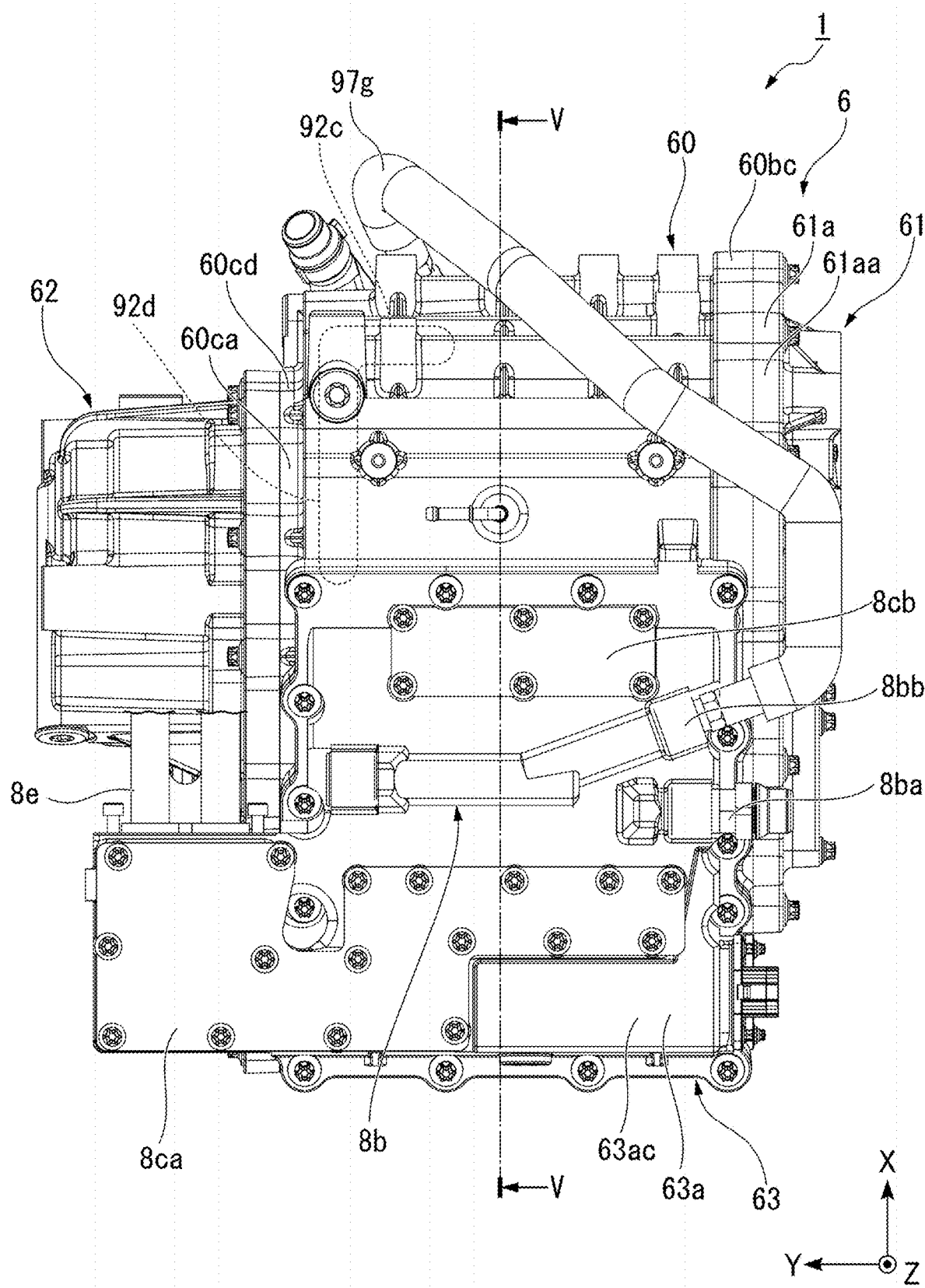
FIG. 3 is a plan view of a motor assembly according to an example embodiment of the present disclosure.

FIG. 1 is a conceptual diagram schematically illustrating the motor assembly 1. FIG. 2 is a perspective view of the motor assembly 1. FIG. 3 is a plan view of the motor assembly 1.

As illustrated in FIG. 1, the motor assembly 1 includes a motor (main motor) 2, a gear portion 3 including a reduction gear 4 and a differential 5, a housing 6, oil O accommodated in a housing 6, and an inverter 8. The oil O is a medium circulating inside the motor.

A housing space 80 for accommodating the motor 2, the gear portion 3, and the inverter 8 is provided inside the housing 6. The housing 6 holds the motor 2, the gear portion 3, and the inverter 8 in the housing space 80. The housing space 80 is partitioned into a motor housing space 81 for housing the motor 2, a gear housing space 82 for housing the gear portion 3, and an inverter housing space 83 for housing a part of the inverter 8 and connection lines. That is, the housing 6 is provided with the motor housing space 81, the gear housing space 82, and the inverter housing space 83.

An oil pool P, i.e., a pool of the oil O, is provided in the lower region in the housing space 80. In the present example embodiment, a bottom portion 81a of the motor housing space 81 is located above a bottom portion 82a of the gear housing space 82. A partition wall opening 68 is provided in a first partition wall 60ba that partitions the motor housing space 81 and the gear housing space 82. The partition wall opening 68 allows the motor housing space 81 and the gear housing space 82 to communicate with each other. The partition wall opening 68 moves the oil O accumulated in the lower region in the motor housing space 81 to the gear housing space 82. Therefore, in the present example embodiment, the oil pool P is located in a lower region of the gear housing space 82.

The motor 2 is housed in the motor housing space 81 of the housing 6. The motor 2 includes a rotor 20 that rotates about the motor axis J2 extending in the horizontal direction, a stator 30 located radially outside the rotor 20, and a first bearing 26 and a second bearing 27 that rotatably support the rotor 20. In the present preferred example embodiment, the motor 2 is an inner-rotor motor.

The rotor 20 rotates when an alternating current is supplied from a battery (not illustrated) to the stator 30 via the inverter 8. As shown in FIG. 3, the rotor 20 includes a shaft 21, a rotor core 24, and a plurality of rotor magnets (not illustrated). The rotor 20 (that is, the shaft 21, the rotor core 24, and the rotor magnet) rotates about the motor axis J2 extending in the horizontal direction and the width direction of the vehicle. The torque of the rotor 20 is transmitted to the gear portion 3.

The shaft 21 is arranged to extend in the axial direction with the motor axis J2 as a center. The shaft 21 is arranged to rotate about the motor axis J2. A hollow portion 22 which is a cavity extending in the axial direction is provided inside the shaft 21. The shaft 21 is a hollow shaft having the hollow portion 22. The shaft 21 includes a communicating hole 23. The communicating hole 23 is arranged to extend in a radial direction to bring a space outside of the shaft 21 and the hollow portion 22 into communication with each other.

The shaft 21 is arranged to extend over the motor housing space 81 and the gear housing space 82 of the housing 6. One end of the shaft 21 protrudes from the motor housing space 81 toward the gear housing space 82. A first gear 41 of the gear portion 3 is fixed to an end of the shaft 21 protruding toward the gear housing space 82.

The shaft 21 is rotatably supported by a pair of bearings (the first bearing 26 and the second bearing 27). The first bearing 26 and the second bearing 27 are located in the motor housing space 81. In addition, the first bearing 26 and the second bearing 27 are located on both axial sides of the shaft 21 with the rotor core 24 interposed therebetween. The first bearing 26 and the second bearing 27 are held in the housing 6. More specifically, the first bearing 26 is held by a closing part 61, and the second bearing 27 is held by the first partition wall 60ba.

The rotor core 24 is defined by laminated silicon steel sheets. The rotor core 24 is a columnar body arranged to extend along the axial direction. A plurality of rotor magnets (not illustrated) is fixed to the rotor core 24. The plurality of rotor magnets are arranged such that the magnetic poles are alternately along the circumferential direction.

The stator 30 includes a stator core 32, coils 31, and an insulator (not illustrated) arranged between the stator core 32 and the coils 31. The stator 30 is held by the housing 6. The stator core 32 includes a plurality of magnetic pole teeth (not illustrated) arranged to project radially inward from an inner circumferential surface of an annular yoke. A coil wire is wound around the magnetic pole teeth. The coil wire wound around the magnetic pole teeth constitutes the coil 31. That is, the coil 31 is wound around the stator core 32 via the insulator. As described later, a coil wire 31b extending from the coil 31 is connected to the inverter 8 via a first bus bar assembly 70 (see FIG. 8) and a second bus bar assembly 77 (via FIG. 9).

The coil 31 has a pair of coil ends 31a. One coil end 31a protrudes to one side in the axial direction of the stator core 32, and the other coil end 31a protrudes to the other side in the axial direction of the stator core 32.

The gear portion 3 is housed in the gear housing space 82 of the housing 6. The gear portion 3 is connected to the shaft 21 on the other side in the axial direction of the motor axis J2. The gear portion 3 includes the reduction gear 4 and the differential 5. A torque outputted from the motor 2 is transferred to the differential 5 through the reduction gear 4.

The reduction gear 4 is connected to the rotor 20 of the motor 2. The reduction gear 4 has a function of increasing the torque outputted from the motor 2 in accordance with a reduction ratio while reducing the rotation speed of the motor 2. The reduction gear 4 is arranged to transfer the torque outputted from the motor 2 to the differential 5.

The reduction gear 4 includes a first gear (i.e., an intermediate drive gear) 41, a second gear (i.e., an intermediate gear) 42, a third gear (i.e., a final drive gear) 43, and an intermediate shaft 45. The torque outputted from the motor 2 is transferred to a ring gear (i.e., a gear) 51 of the differential 5 through the shaft 21 of the motor 2, the first gear 41, the second gear 42, the intermediate shaft 45, and the third gear 43.

The first gear 41 is arranged on an outer circumferential surface of the shaft 21 of the motor 2. The first gear 41 is arranged to rotate about the motor axis J2 together with the shaft 21. The intermediate shaft 45 is arranged to extend along an intermediate axis J4 parallel to the motor axis J2. The intermediate shaft 45 is arranged to rotate about the intermediate axis J4. Each of the second gear 42 and the third gear 43 is arranged on an outer circumferential surface of the intermediate shaft 45. The second gear 42 and the third gear 43 are connected to each other through the intermediate shaft 45. Each of the second gear 42 and the third gear 43 is arranged to rotate about the intermediate axis J4. The second gear 42 is arranged to mesh with the first gear 41. The third gear 43 is arranged to mesh with the ring gear 51 of the differential 5.

The differential 5 is connected to the motor 2 through the reduction gear 4. The differential 5 is a device arranged to transfer the torque outputted from the motor 2 to wheels of the vehicle. The differential 5 has a function of transferring the same torque to axles 55 of left and right wheels while absorbing a difference in speed between the left and right wheels when the vehicle is turning. The differential 5 includes the ring gear 51, a gear housing (not illustrated), a pair of pinion gears (not illustrated), a pinion shaft (not illustrated), and a pair of side gears (not illustrated).

The ring gear 51 is arranged to rotate about a differential axis J5 parallel to the motor axis J2. The torque outputted from the motor 2 is transferred to the ring gear 51 through the reduction gear 4. That is, the ring gear 51 is connected to the motor 2 with other gears intervening therebetween.

Figure 4:
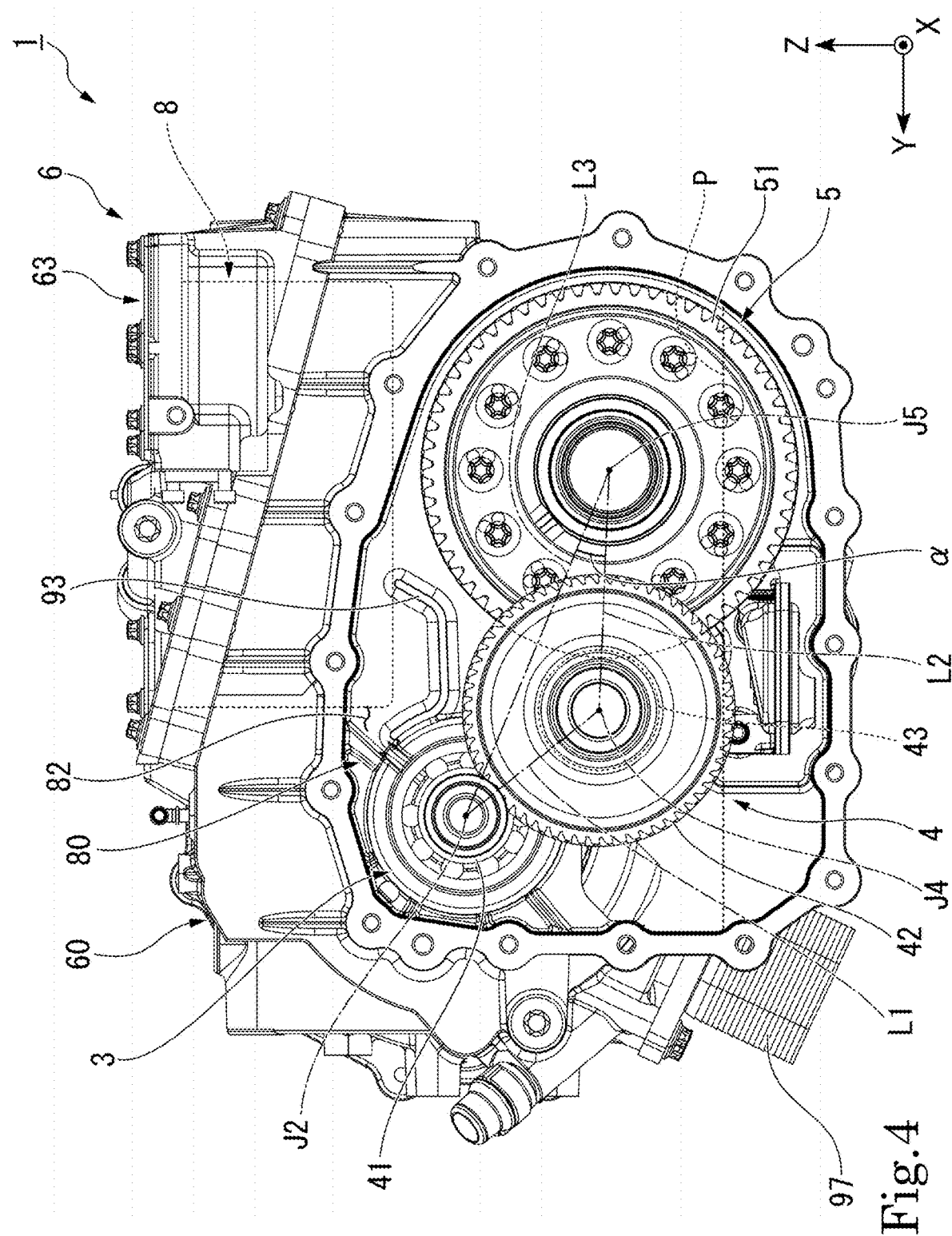
FIG. 4 is a side view of a motor assembly according to an example embodiment of the present disclosure as viewed from the other side in the axial direction.

FIG. 4 is a side view of the motor assembly 1 as viewed from the other side in the axial direction. In FIG. 4, a part of the housing 6 (gear housing 62) is omitted.

The motor axis J2, the intermediate axis J4, and the differential axis J5 are arranged to extend in parallel with one another along a horizontal direction. Each of the intermediate axis J4 and the differential axis J5 is arranged lower than the motor axis J2.

A line segment that imaginarily joins the motor axis J2 and the intermediate axis J4 when viewed in the axial direction of the motor axis J2 is defined as a first line segment L1, a line segment that imaginarily joins the intermediate axis J4 and the differential axis J5 when viewed in the axial direction of the motor axis J2 is defined as a second line segment L2, and a line segment that imaginarily joins the motor axis J2 and the differential axis J5 when viewed in the axial direction of the motor axis J2 is defined as a third line segment L3.

According to the present example embodiment, the second line segment L2 extends substantially along a horizontal direction. That is, the intermediate axis J4 and the differential axis J5 are arranged side by side substantially in the horizontal direction. This allows the reduction gear 4 and the differential 5 to be arranged side by side along the horizontal direction, which leads to a reduced vertical dimension of the motor assembly 1.

The inverter 8 is electrically connected to the motor 2. The inverter 8 controls a current supplied to the motor 2. That is, the inverter 8 supplies power to the motor 2.

Figure 5:
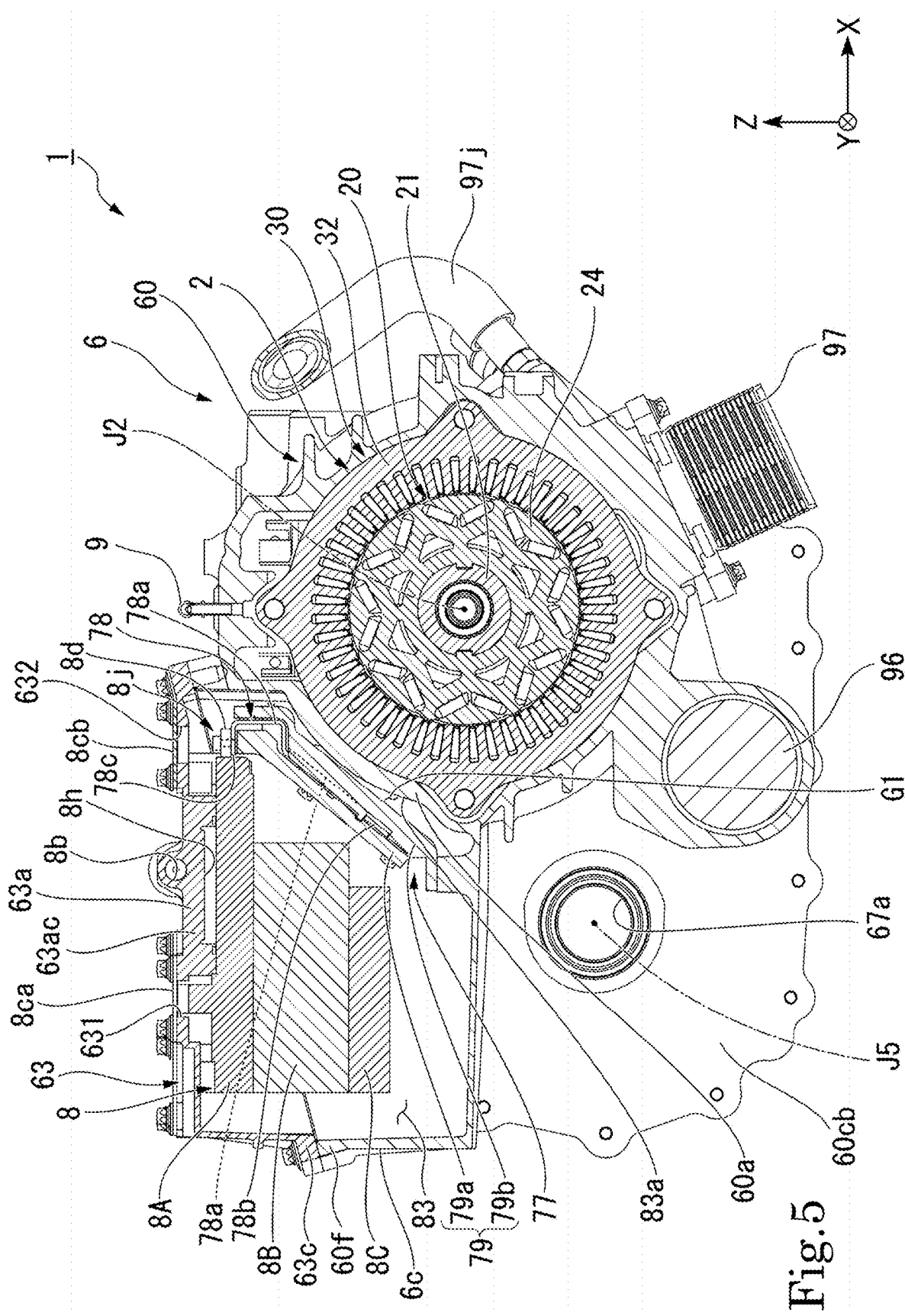
FIG. 5 is a cross-sectional view of the motor assembly taken along line V-V in FIG. 3.

FIG. 5 is a cross-sectional view of the motor assembly 1 taken along line V-V in FIG. 3.

The inverter 8 is fixed to an inverter housing 63 of the housing 6. More specifically, the inverter 8 is fixed to the lower surface of a main body housing portion 63a of the inverter housing 63.

The inverter 8 includes a control element that controls power supplied to the motor 2. The control element is, for example, an IGBT. In addition, the inverter of the present example embodiment is provided with a control unit that controls an auxiliary machine such as a pump 96.

The inverter 8 includes a switching element 8A, a capacitor 8B, a power substrate 8C, and an inverter bus bar 8d. The switching element 8A, the capacitor 8B, and the power substrate 8C are laminated in this order from the upper side to the lower side. The switching element 8A of the present example embodiment is an insulated gate bipolar transistor (IGBT). The switching element 8A and the capacitor 8B are each connected to the power substrate 8C. The inverter 8 is connected to a battery (not illustrated) mounted on the vehicle, converts a direct current supplied from the battery into an alternating current, and supplies the alternating current to the motor 2.

The switching element 8A has a rectangular shape when viewed from one direction (the vertical direction in the present example embodiment). In addition, the motor 2 tends to have a larger dimension in the axial direction than in the radial direction. Therefore, as illustrated in the present example embodiment, by disposing the switching element 8A with the axial direction as the longitudinal direction, the motor assembly 1 can be downsized. Further, as illustrated in the present example embodiment, the axial position of the switching element 8A is disposed to overlap the axial position of the motor 2, so that the axial dimension of the motor assembly 1 can be reduced. In addition, the area of the switching element 8A when viewed from the vertical direction tends to be large as compared with other members (the capacitor 8B and the power substrate 8C). As illustrated in the present example embodiment, when viewed from the vertical direction, the entire inverter 8 can be downsized by disposing other members to overlap the switching element 8A.

The inverter bus bar 8d extends from the switching element 8A. The inverter bus bar 8d is connected to a second bus bar 78 described later at a connection portion 8j. In the connection portion 8j, the horizontal direction of the inverter bus bar 8d and the second bus bar 78 is defined as a plate thickness direction. Further, in the connection portion 8j, the inverter bus bar 8d and the second bus bar 78 have fixing holes penetrating in the vertical direction. The connection portion 8j has fixing screws inserted into the fixing holes of the inverter bus bar 8d and the second bus bar 78 to connect the inverter bus bar 8d and the second bus bar 78.

As illustrated in FIG. 4, the inverter 8 is disposed above the third line segment L3 when viewed from the axial direction. That is, the inverter 8 is disposed so as to avoid the motor axis J2, the intermediate axis J4, and the differential axis J5 when viewed from the axial direction. As a result, the projection area of the viewed motor assembly 1 in the axial direction can be reduced.

According to the present example embodiment, the inverter 8 is located above the upper end of the ring gear 51 when viewed from the axial direction. Therefore, it is possible to protect the inverter 8 using the ring gear 51 against impact from the lower side, and it is possible to suppress application of a load to the inverter 8 in an unexpected collision or the like. In addition, it is possible to suppress an increase in the projection area of the motor assembly 1 in the axial direction and to realize downsizing of the motor assembly 1.

According to the present example embodiment, the inverter 8 is located on the side opposite to a cooler 97 across the motor axis J2 as viewed in the vertical direction. This makes it possible to reduce the dimension of the motor assembly 1 measured in the horizontal direction, which leads to a reduced size of the motor assembly 1.

Figure 6:
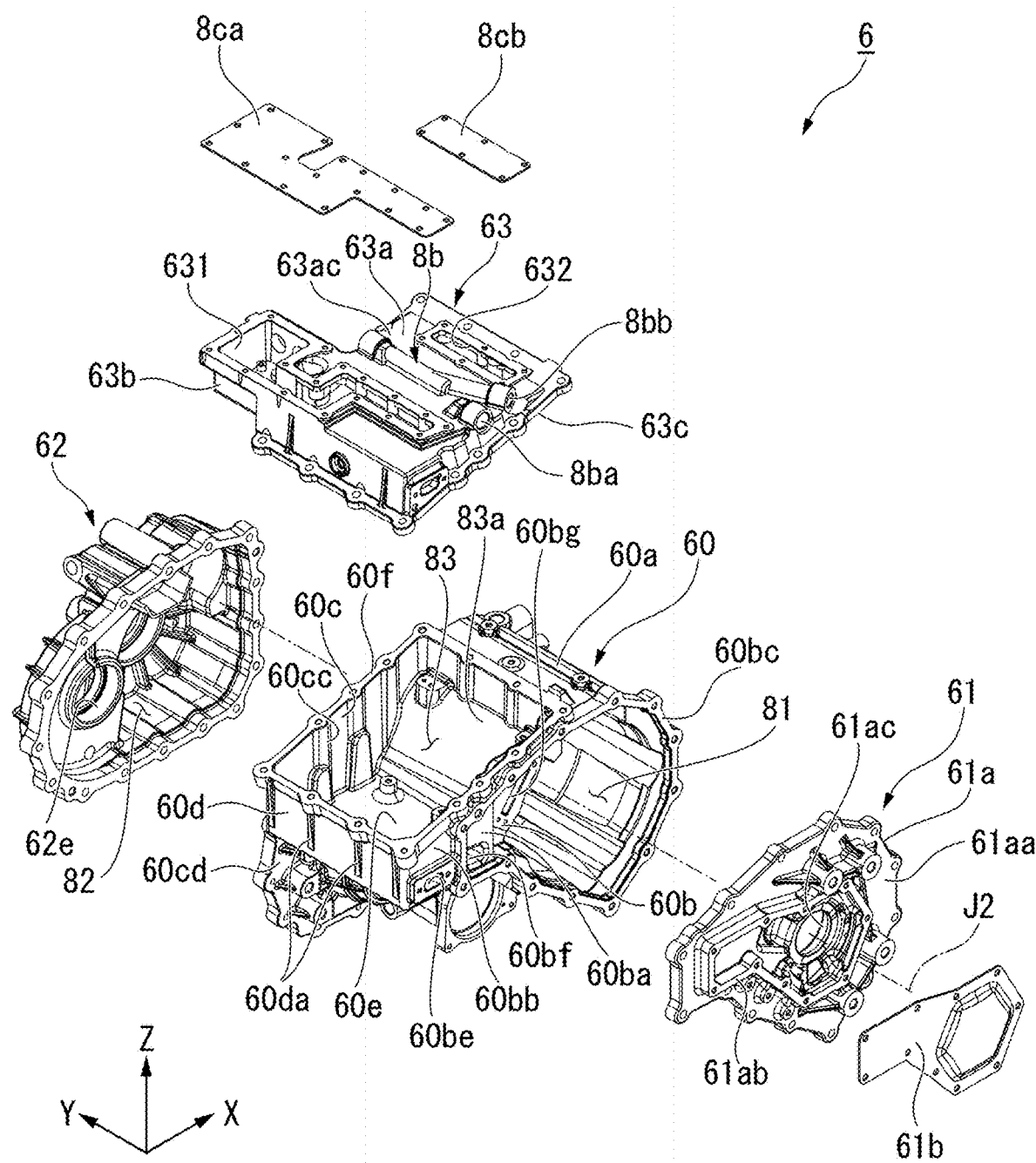
FIG. 6 is an exploded perspective view of a housing according to an example embodiment of the present disclosure.
Figure 7:
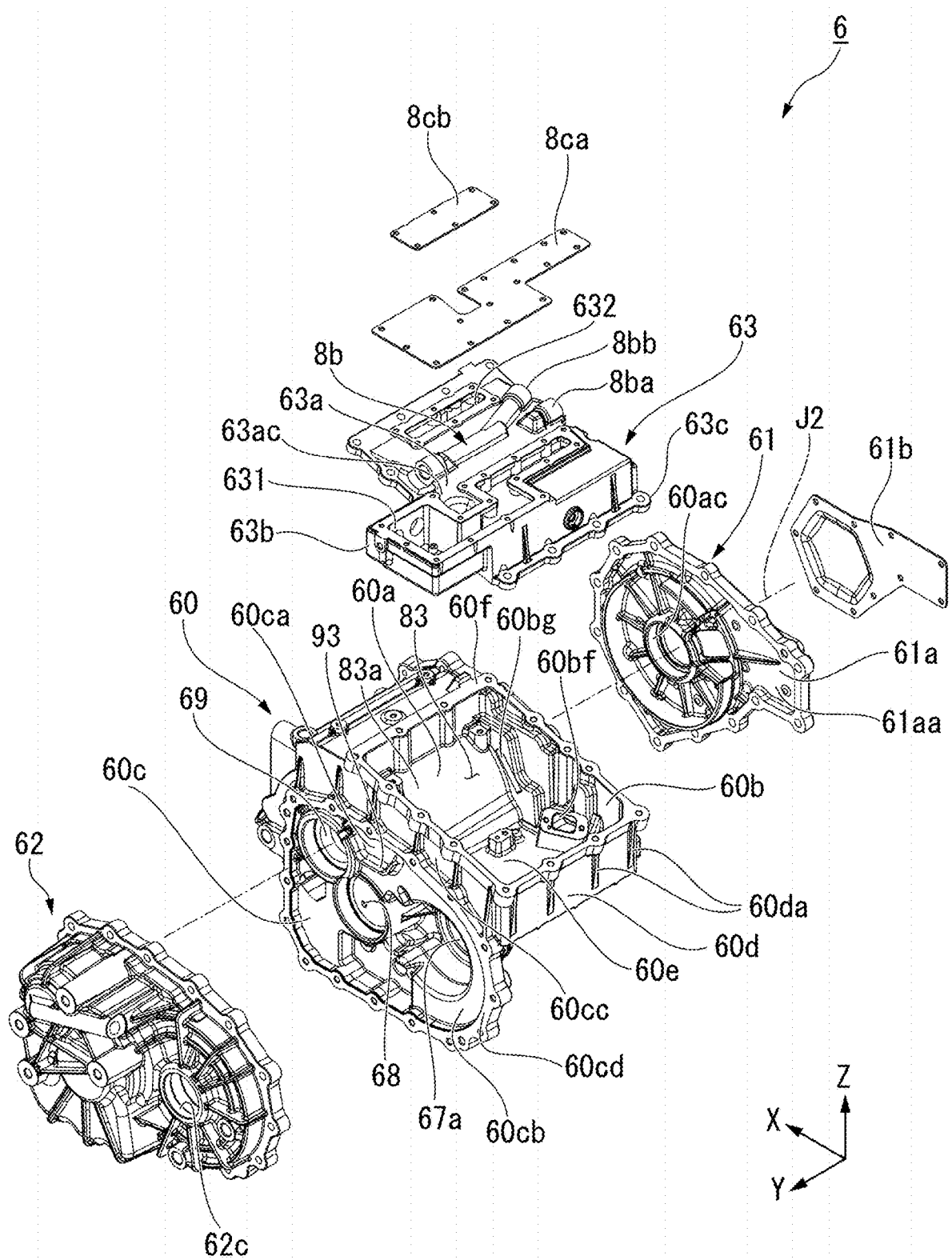
FIG. 7 is an exploded perspective view of a housing according to an example embodiment of the present disclosure.

FIGS. 6 and 7 are exploded perspective views of the housing 6 viewed from different directions.

The housing 6 includes a housing body 60, a closing part 61, a gear housing 62, and an inverter housing 63. The closing part 61, the gear housing 62, and the inverter housing 63 are fixed to the housing body 60.

The housing body 60 and the closing part 61 are disposed to face each other in the axial direction and are fixed to each other. The housing body 60 and the closing part 61 surround the motor housing space 81 in which the motor 2 is housed. The housing body 60 and the closing part 61 constitute a motor housing portion 6a surrounding the motor housing space 81.

That is, the housing 6 includes the motor housing portion 6a.

The housing body 60 and the gear housing 62 are disposed to face each other in the axial direction and are fixed to each other. A space surrounded by the housing body 60 and the gear housing 62 constitutes the gear housing space 82 in which the gear portion 3 is housed. The housing body 60 and the gear housing 62 constitute a gear housing portion 6b surrounding the gear housing space 82. That is, the housing 6 includes the gear housing portion 6b.

The housing body 60 and the inverter housing 63 are arranged to face each other in the vertical direction and are fixed to each other. A space surrounded by the housing body 60 and the inverter housing 63 constitutes an inverter housing space 83 in which the inverter 8 is housed. The housing body 60 and the inverter housing 63 constitute an inverter housing portion 6c surrounding the inverter housing space 83. That is, the housing 6 includes the inverter housing portion 6c.

The housing body 60 includes a cylindrical peripheral wall portion 60a extending in the axial direction, a plate-shaped first side plate portion 60b and a plate-shaped second side plate portion 60c extending along a plane orthogonal to the axial direction, and a plate-shaped first connection plate portion 60d and a plate-shaped second connection plate portion 60e extending along the axial direction.

The peripheral wall portion 60a has a cylindrical shape centered on the motor axis J2. The peripheral wall portion 60a surrounds the motor 2 from the radially outer side.

As illustrated in FIG. 2, a first rib 60aa extending along the motor axis J2 and a second rib 60ab extending along the circumferential direction of the motor axis J2 are provided on the outer circumferential surface of the peripheral wall portion 60a.

A breather device for adjusting the internal pressure of the motor housing space 81 may be provided in a region facing upward in the outer circumferential surface of the peripheral wall portion 60a. The breather device 9 is preferably provided on the upper side of the housing 6.

As illustrated in FIG. 6, the first side plate portion 60b is located at an end on one side (−Y side) in the axial direction of the peripheral wall portion 60a. The first side plate portion 60b is connected to an end on one side in the axial direction of the peripheral wall portion 60a. The first side plate portion 60b extends from an edge on one side (−Y side) in the axial direction of the peripheral wall portion 60a to the vehicle rear side. The first side plate portion 60b is located on one side in the axial direction of the inverter 8. One side in the axial direction of the inverter 8 is covered.

Figure 8:
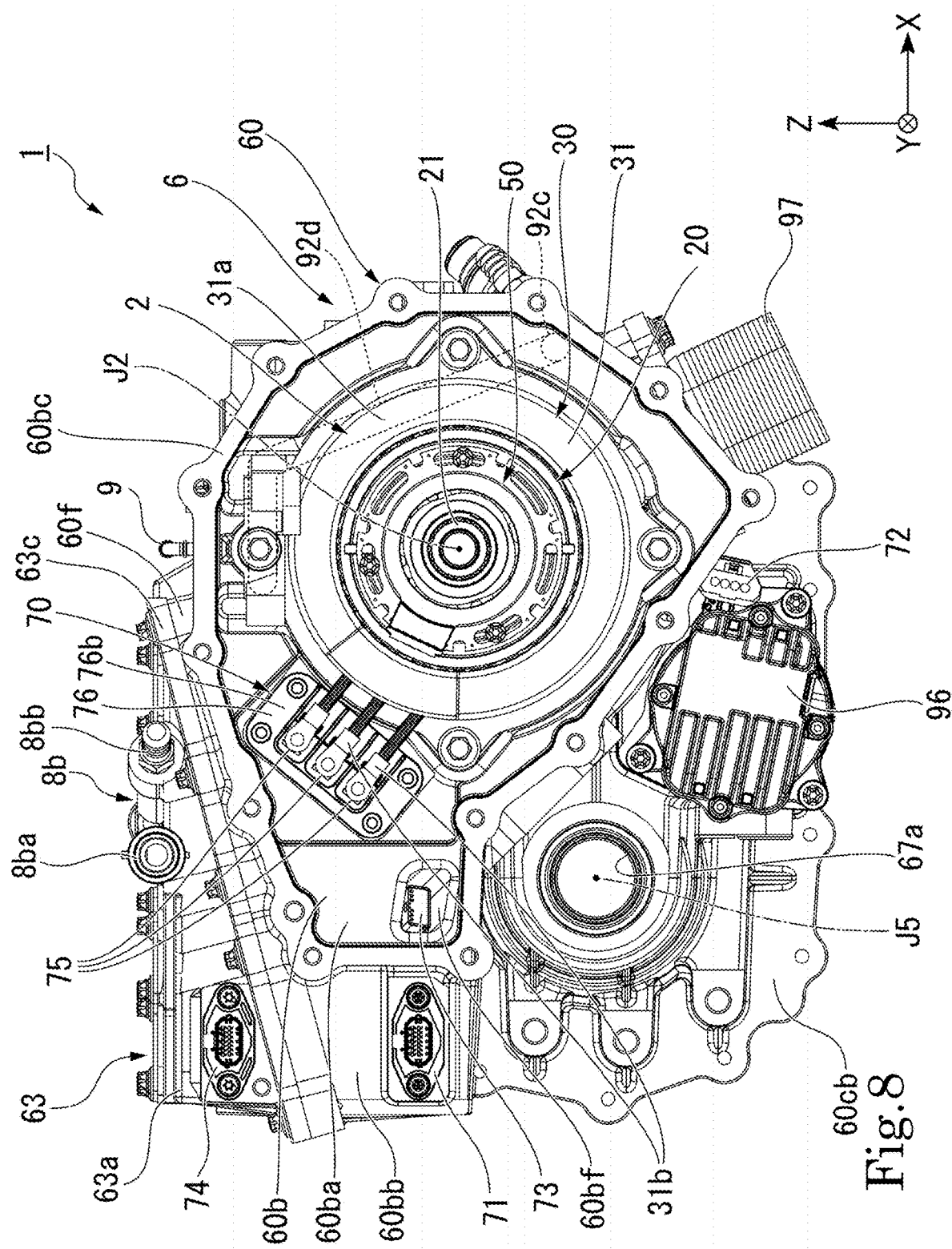
FIG. 8 is a side view of a motor assembly according to an example embodiment of the present disclosure as viewed from one side in the axial direction.

FIG. 8 is a side view of the motor assembly 1 as viewed from one side in the axial direction. In FIG. 8, illustration of the closing part 61 is omitted.

The first side plate portion 60b includes the first partition wall 60ba covered with the closing part 61, and a first protrusion 60bb located on the vehicle rear side of the first partition wall 60ba and exposed from the closing part 61. The first partition wall 60ba (that is, a part of the first side plate portion 60b) partitions the housing space 80 into the motor housing space 81 and the inverter housing space 83.

As illustrated in FIG. 6, the first protrusion 60bb is provided with a first through hole 60be that allows the inside and the outside of the inverter housing space 83 to communicate with each other. That is, the first through hole 60be penetrating in the axial direction is provided in the first side plate portion 60b. A control line that supplies a power source voltage and a control signal from the inverter 8 to the pump 96 passes through the first through hole 60be.

As illustrated in FIG. 8, a first connector 71 is attached to the first through hole 60be. The first connector 71 is inserted into the first through hole 60be from one side in the axial direction. That is, the first connector 71 is attached to the first through hole 60be from the outside of the inverter housing space 83. A control line of the pump 96 is connected to the inverter 8 via the first connector 71.

As illustrated in FIG. 6, the first partition wall 60ba is provided with a second through hole 60bf and a third through hole 60bg that allow the motor housing space 81 and the inverter housing space 83 to communicate with each other. That is, the first side plate portion 60b is provided with the second through hole 60bf and the third through hole 60bg penetrating in the axial direction.

A signal line of a rotation angle sensor 50 that detects the rotation angle of the motor 2 passes through the second through hole 60bf. As illustrated in FIG. 8, a sensor connector 73 is attached to the second through hole 60bf.

As illustrated in FIG. 6, a power line that connects the inverter 8 and the stator 30 and supplies a power source voltage to the stator 30 passes through the third through hole 60bg. As illustrated in FIG. 8, the first bus bar assembly 70 is inserted into the third through hole 60bg. The first bus bar assembly 70 will be described in detail later. In the first partition wall 60ba, a screw hole for fixing the first bus bar assembly 70 to the first partition wall 60ba is provided around the third through hole. The first bus bar assembly 70 is inserted into the third through hole 60bg from one side in the axial direction.

The first side plate portion 60b is provided with a motor-side flange portion 60bc for fixing the closing part 61. The motor-side flange portion 60bc is provided with a plurality of screw holes for fixing the closing part 61 to the housing body 60. The motor-side flange portion 60bc protrudes in the axial direction from a surface facing one side in the axial direction of the first partition wall 60ba and the first protrusion 60bb.

According to the present example embodiment, the first bus bar assembly 70, the sensor connector 73, and the first connector 71 are attached to the housing body 60 by being inserted from one side to the other side in the axial direction with respect to the first side plate portion 60b. Therefore, according to the present example embodiment, the first bus bar assembly 70, the sensor connector 73, and the first connector 71 can be assembled to the housing body 60 from one direction, and the assembly process can be simplified. In addition, since the assembling direction of the first bus bar assembly 70, the sensor connector 73, and the first connector 71 coincides with the assembling direction of the closing part 61, the assembling process of the motor assembly 1 can be further simplified.

In the present example embodiment, a motor-side flange portion 60bc protruding to one side in the axial direction is provided between the sensor connector 73 and the first connector 71.

As illustrated in FIG. 7, the second side plate portion 60c faces the first side plate portion 60b in the axial direction. The second side plate portion 60c is located at the end on the other side (+Y side) in the axial direction of the peripheral wall portion 60a. The second side plate portion 60c is located on the other side in the axial direction of the inverter 8. The second side plate portion 60c covers the other side in the axial direction of the inverter 8.

The second side plate portion 60c includes a second partition wall 60ca that covers the opening on the other side in the axial direction of the peripheral wall portion 60a, an projecting portion 60cb extending from the second partition wall 60ca toward the vehicle rear side, and a second protrusion 60cc extending upward from the projecting portion 60cb. The second partition wall 60ca and the projecting portion 60cb are covered with the gear housing 62. On the other hand, the second protrusion 60cc is exposed from the gear housing 62. A first axle insertion hole 67a, through which a drive shaft (not illustrated) arranged to support a wheel is arranged to pass, is defined in the projecting portion 60cb.

The second partition wall 60ca partitions the housing space 80 into the motor housing space 81 and the gear housing space 82. The second partition wall 60ca is provided with the partition wall opening 68 that guides oil in the motor housing space 81 into the gear housing space 82, and an insertion hole 69 through which the shaft 21 of the motor 2 is inserted.

The second side plate portion 60c is provided with a gear-side flange portion 60cd for fixing the gear housing 62. The gear-side flange portion 60cd is provided with a plurality of screw holes for fixing the gear housing 62 to the housing body 60. The gear-side flange portion 60cd surrounds the second partition wall 60ca and the projecting portion 60cb. The gear-side flange portion 60cd protrudes in the axial direction from a surface facing the other side in the axial direction of the projecting portion 60cb and the second protrusion 60cc.

The first connection plate portion 60d and the second connection plate portion 60e connect the first side plate portion 60b and the second side plate portion 60c. The first connection plate portion 60d and the second connection plate portion 60e are orthogonal to each other. The first connection plate portion 60d and the second connection plate portion 60e are connected to each other.

The first connection plate portion 60d connects end edges on the vehicle rear side of the first side plate portion 60b and the second side plate portion 60c. The first connection plate portion 60d is located on the vehicle rear side of the peripheral wall portion 60a. The plate thickness direction of the first connection plate portion 60d coincides with the vehicle front-rear direction. The first connection plate portion 60d is located on the vehicle rear side of the inverter 8. The first connection plate portion 60d covers the vehicle rear side of the inverter 8.

The first connection plate portion 60d is provided with a plurality of ribs 60da extending along the vertical direction.

The rib 60da extends downward from an inverter-side flange portion 60f located at the upper end of the first connection plate portion 60d. By providing the rib 60da on the first connection plate portion 60d, the rigidity of the housing body 60 can be increased, and the amplification of vibration and noise generated by the rotation of the motor 2 can be suppressed.

The second connection plate portion 60e connects the lower edges of the first side plate portion 60b and the second side plate portion 60c. The second connection plate portion 60e is located on the vehicle rear side of the peripheral wall portion 60a. The plate thickness direction of the second connection plate portion 60e coincides with the vertical direction. The second connection plate portion 60e is connected to the peripheral wall portion 60a. The second connection plate portion 60e extends from the peripheral wall portion 60a toward the vehicle rear side.

The second connection plate portion 60e is connected to the first connection plate portion 60d at the end on the vehicle rear side. That is, the first connection plate portion 60d extends upward from the end on the vehicle rear side of the second connection plate portion 60e. The second connection plate portion 60e is located below the inverter 8. The second connection plate portion 60e covers the lower side of the inverter 8.

Although not illustrated, a plurality of ribs arranged along the axial direction are provided on the lower surface of the second connection plate portion 60e. The plurality of ribs extend from the peripheral wall portion 60a toward the vehicle rear side. Since the rib is provided on the second connection plate portion 60e, the rigidity of the housing body 60 can be increased, and amplification of vibration and noise generated by the rotation of the motor 2 can be suppressed.

The first side plate portion 60b, the second side plate portion 60c, a part of the peripheral wall portion 60a, the first connection plate portion 60d, and the second connection plate portion 60e surround the periphery of the inverter 8. That is, the inverter housing portion 6c includes a peripheral wall portion 60a, a first side plate portion 60b, a second side plate portion 60c, a first connection plate portion 60d, and a second connection plate portion 60e. The inverter-side flange portion 60f for fixing the inverter housing 63 is provided at a part of the peripheral wall portion 60a and the upper end portions of the first connection plate portion 60d, the first side plate portion 60b, and the second side plate portion 60c.

As illustrated in FIG. 3, the inverter-side flange portion 60f is provided with a plurality of screw holes for fixing the gear housing 62 to the housing body 60. The inverter-side flange portion 60f is inclined downward toward the rear as viewed from the vehicle width direction. That is, the inverter-side flange portion 60f is inclined with respect to the second connection plate portion 60e.

As illustrated in FIG. 6, the closing part 61 is fixed to the motor-side flange portion 60bc of the housing body 60. The closing part 61 closes an opening on one side in the axial direction of the peripheral wall portion 60a of the housing body 60. A seal (not illustrated) is sandwiched between the closing part 61 and the motor-side flange portion 60bc. The seal prevents the oil in the motor housing space 81 from leaking out from between the closing part 61 and the housing body 60.

The closing part 61 covers the sensor connector 73 fixed to a first partition wall of the housing body 60 illustrated in FIG. 8 and the first bus bar assembly 70. The closing part 61 may have a function as a magnetic shield. At this time, it is possible to suppress noise generated in the wiring of the rotation angle sensor 50 and the first bus bar assembly 70 from affecting the first connector 71 and the like.

As illustrated in FIG. 6, the closing part 61 includes a closing part body 61*a* and a cover 61*b*. The closing part 61 includes a seal (not illustrated) that seals between the closing part body 61*a* and the cover 61*b*.

The cover 61*b* is fixed to a cover flange portion 61*ab* provided on the closing part body 61*a*. A seal (not illustrated) is sandwiched between the cover 61*b* and the cover flange portion 61*ab*. The seal prevents the oil in the motor housing space 81 from leaking out from between the cover 61*b* and the closing part body 61*a*.

The gear housing 62 is fixed to the gear-side flange portion 60*cd*. The shape of the gear housing 62 is a concave shape open to one side in the axial direction. The opening of the gear housing 62 is covered by the second side plate portion 60*c*. A space surrounded by the gear housing 62 and the second side plate portion 60*c* constitutes the gear housing space 82 for housing the gear portion 3.

The inverter housing 63 is fixed to the inverter-side flange portion 60*f*. The shape of the inverter housing 63 is a concave shape open downward. The opening of the inverter housing 63 is covered by the housing body 60. More specifically, the opening of the inverter housing 63 is covered by the peripheral wall portion 60*a* and the second connection plate portion 60*e*.

The inverter housing 63 and the housing body 60 are arranged to face each other. A space surrounded by the inverter housing 63 and the housing body 60 constitutes the inverter housing space 83 that houses the inverter 8. That is, the inverter housing space 83 is surrounded by the inverter housing 63 and the housing body 60. The inverter housing 63 houses the inverter 8 and a part of wiring extending from the inverter 8.

The inverter housing 63 includes the main body housing portion 63*a* and a power line housing portion 63*b*. The main body housing portion 63*a* and the power line housing portion 63*b* are arranged in the axial direction. The power line housing portion 63*b* is located on the other side (+Y side) in the axial direction with respect to the main body housing portion 63*a*.

As illustrated in FIG. 2, the power line housing portion 63*b* holds a power supply connector 8*e*. The power line housing portion 63*b* is located outside the inverter housing portion 6*c* when viewed from the vertical direction. The power supply connector 8*e* electrically connects a battery (not illustrated) mounted on the vehicle and the inverter 8, and supplies power from the battery to the inverter 8. The power supply connector 8*e* protrudes in the width direction from the side surface of the inverter 8. The power supply connector 8*e* has a connector terminal. The connector terminal protrudes from the power supply connector 8*e* in the vehicle front direction.

As illustrated in FIG. 5, the main body housing portion 63*a* has a concave shape open downward. A mounting flange portion 63*c* is provided at an edge of the opening of the main body housing portion 63*a*. The mounting flange portion 63*c* faces the inverter-side flange portion 60*f* in the axial direction. The inverter housing 63 is fixed to the inverter-side flange portion 60*f* at the mounting flange portion 63*c*.

As illustrated in FIG. 8, a signal connector 74 is provided on a side surface on one side in the axial direction of the main body housing portion 63*a*. The signal connector 74 is a connector of a signal line connected to the outside.

The main body housing portion 63*a* has a plate-shaped portion 63*ac* extending along the horizontal direction. The plate-shaped portion 63*ac* is provided with a cooling water passage 8*b* through which cooling water for cooling the inverter 8 passes.

The cooling water passage 8*b* has an introduction port 8*ba* and a discharge port 8*bb* that are open to one side in the axial direction. The introduction port 8*ba* and the discharge port 8*bb* are located on one side in the width direction. That is, the introduction port 8*ba* and the discharge port 8*bb* of the cooling water passage 8*b* are provided on the side surface on one side in the axial direction of the main body housing portion 63*a*. That is, the flow path of the cooling water passage 8*b* is generally U-shaped when viewed from the upper side in the gravity direction.

The cooling water passage 8*b* is located above the inverter 8 in the direction of gravity. More specifically, the cooling water passage 8*b* is located adjacent to the inverter 8.

As illustrated in FIG. 5, the cooling water passage 8*b* includes a cooling unit 8*h*. The cooling unit 8*h* is widened in the horizontal direction when viewed from the upper side in the gravity direction. As a result, the control element of the inverter 8 can be efficiently cooled. Note that the cooling water passage 8*b* may be provided integrally with the inverter housing 63 and supported.

According to the present example embodiment, the cooling water passage 8*b* for cooling the inverter 8 is located above the inverter 8. Therefore, the cooling water passage 8*b* is not disposed at a portion in contact with the housing 6 or in the vicinity thereof. As a result, the heat of the motor 2 is less likely to be transferred to the cooling water, and the cooling efficiency of the inverter by the cooling water can be enhanced.

According to the present example embodiment, the cooling water passage 8*b* is provided in the inverter housing 63.

As illustrated in FIG. 2, the plate-shaped portion 63*ac* of the main body housing portion 63*a* is provided with a first window portion 631 and a second window portion 632 penetrating in the vertical direction. A first lid member 8*ca* and a second lid member 8*cb* are fixed to the plate-shaped portion 63*ac*. The first lid member 8*ca* covers the first window portion 631. The second lid member 8*cb* covers the second window portion 632. The cooling water passage 8*b* extends between the first window portion 631 and the second window portion 632 in the front-rear direction.

The first window portion 631 is located immediately above a portion where the inverter 8 and the power supply connector 8*e* are fastened. Further, a part of the first window portion 631 opens the power line housing portion 63*b* upward. The first operator inserts a tool into the inverter housing space 83 from the first window portion 631 to perform electrical connection work between the control element of the inverter 8 and the power supply connector 8*e* and connection work of the power supply wiring housed in the power line housing portion 63*b*.

As illustrated in FIG. 5, the second window portion 632 is located immediately above the connection portion 8*j* between the inverter bus bar 8*d* and the second bus bar 78. The operator inserts the tool into the inverter housing space 83 from the second window portion 632, and connects the inverter bus bar 8*d* and the second bus bar 78 at the connection portion 8*j*.

An operation of fixing the inverter housing 63 and the housing body 60 will be described.

The inverter 8 is fixed to the inverter housing 63 in advance. In addition, the second bus bar assembly 77 is fixed to the housing body 60 in advance. Further, the second bus bar 78 and a first bus bar 75 are connected in advance. In this state, the inverter housing 63 is fixed to the housing body 60.

Next, a tool is inserted from the second window portion 632 of the inverter housing 63 to connect the second bus bar 78 and the inverter bus bar 8*d*. Then, the second window portion 632 is covered by the second lid member 8*cb*. Through the above steps, the inverter housing 63 and the housing body 60 are fixed, and the inverter 8 and the motor 2 are electrically connected.

Figure 9:
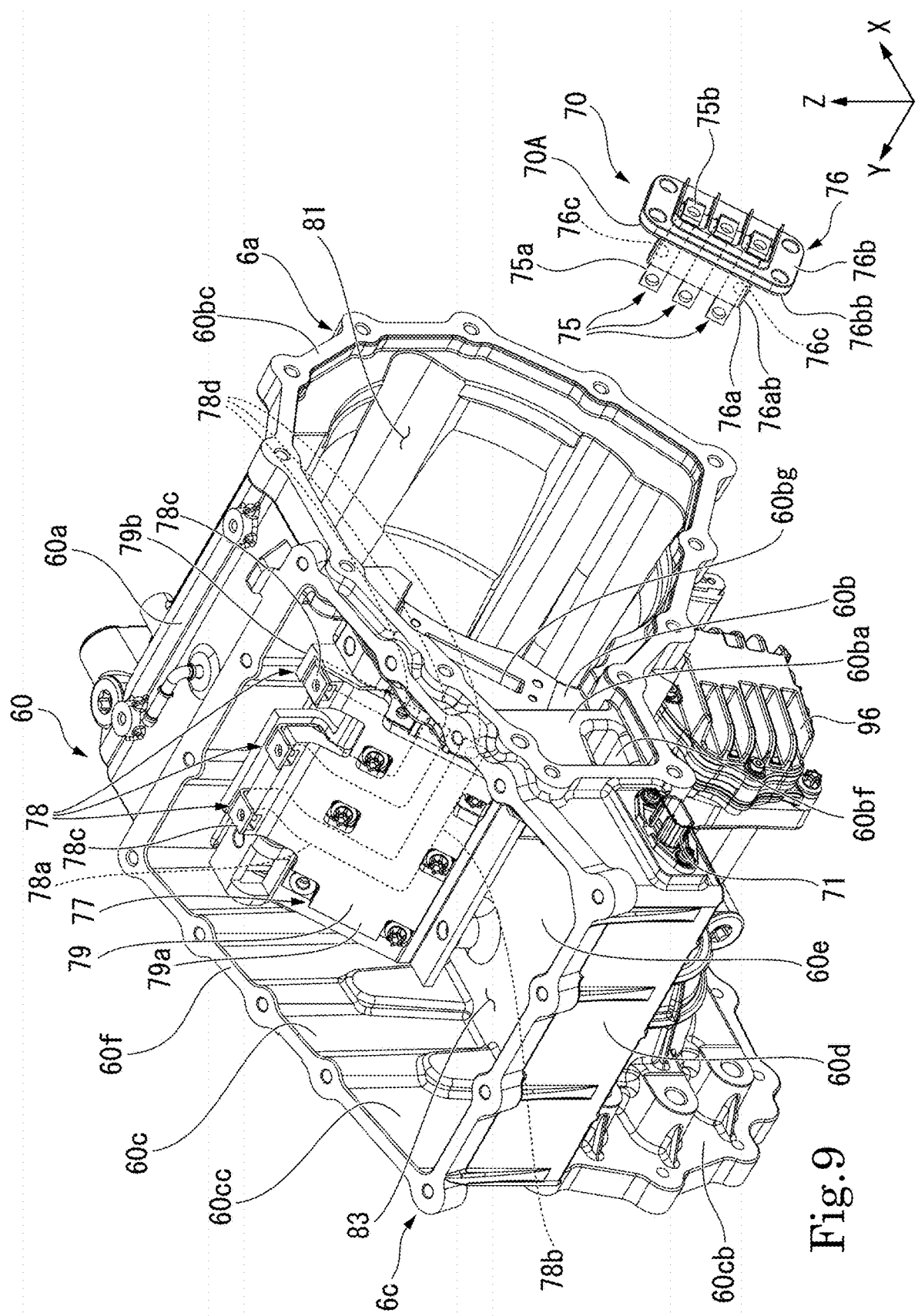
FIG. 9 is an exploded perspective view of a motor assembly according to an example embodiment of the present disclosure.

FIG. 9 is an exploded perspective view of the motor assembly 1.

The motor assembly 1 includes the first bus bar 75 and the second bus bar 78 that electrically connect the motor 2 and the inverter 8. The first bus bar 75 electrically connects the stator 30 of the motor 2 and the second bus bar 78. The second bus bar 78 electrically connects the first bus bar 75 and the inverter 8. The first bus bar 75 constitutes a part of the first bus bar assembly 70. The second bus bar 78 constitutes a part of the second bus bar assembly 77. Hereinafter, the first bus bar assembly 70 and the second bus bar assembly 77 will be specifically described.

The first bus bar assembly 70 includes a plurality of (three) first bus bars 75, a first bus bar holder 76 that holds the plurality of first bus bars 75, and a seal 70A.

The first bus bar 75 is made of a plate-shaped conductor. The three first bus bars 75 are connected to the coil wires 31*b* extending from the U-phase, V-phase, and W-phase coils 31 of the stator 30, respectively. In addition, each of the three first bus bars 75 is connected to the inverter 8 via the second bus bar 78. That is, the first bus bar 75 electrically connects the motor 2 and the inverter 8. The first bus bar 75 supplies the alternating current output from the inverter 8 to the motor 2. The first bus bar 75 is fixed to the first side plate portion 60*b* of the housing body 60 via the first bus bar holder 76.

The first bus bar 75 includes a first bus bar body portion 75*a* extending along the axial direction and a terminal connection portion 75*b* located on one side in the axial direction of the first bus bar body portion 75*a*.

The first bus bar body portion 75*a* is inserted into a holding hole 76*c* provided in the first bus bar holder 76. The end on the other side in the axial direction of the first bus bar body portion 75*a* is exposed from the first bus bar holder 76. The first bus bar 75 is connected to the second bus bar 78 at the end on the other side in the axial direction of the first bus bar body portion 75*a*.

The terminal connection portion 75*b* is bent in the plate thickness direction of the first bus bar body portion 75*a*. The plate thickness direction of the terminal connection portion 75*b* coincides with the axial direction. The terminal connection portion 75*b* is exposed from the first bus bar holder 76. The terminal connection portion 75*b* is connected to the coil 31 of the motor 2. More specifically, the terminal connection portion 75*b* is connected to the conductive wire extending from the coil 31 and bundled.

The first bus bar holder 76 is made of an insulating resin material. In the present example embodiment, the first bus bar holder 76 is made of a resin material. The first bus bar holder 76 includes a holder body portion 76*a* that holds the first bus bar 75, and a holder flange 76*b* that protrudes from the holder body portion 76*a*.

The holder body portion 76*a* has a quadrangular prism shape extending along the axial direction. The holder body portion 76*a* is inserted into the third through hole 60*bg* provided in the first side plate portion 60*b*. The holder body portion 76*a* has an outer circumferential surface 76*ab* facing a direction orthogonal to the axial direction. The holder body portion 76*a* has three holding holes 76*c* penetrating in the axial direction.

One first bus bar 75 is inserted into one holding hole 76*c*. For example, an adhesive is injected between the inner circumferential surface of the holding hole 76*c* and the first bus bar 75. The adhesive seals the gap between the inner circumferential surface of the holding hole 76*c* and the first bus bar 75.

The holder flange 76*b* is located at an end on one side in the axial direction of the holder body portion 76*a*. The holder flange 76*b* protrudes from the outer circumferential surface 76*ab* of the holder body portion 76*a* along a plane orthogonal to the axial direction. The holder flange 76*b* extends over the entire circumference of the holder body portion 76*a*.

The holder flange 76*b* is provided with a fixing hole 76*ba* penetrating in the axial direction. A fixing screw for fixing the first bus bar assembly 70 to the first side plate portion 60*b* of the housing body 60 is inserted into the fixing hole 76*ba*.

The holder flange 76*b* has an opposing surface 76*bb* facing the other side in the axial direction. The opposing surface 76*bb* faces a surface of the first side plate portion 60*b* facing one side in the axial direction via the seal 70A. The seal 70A is sandwiched in the axial direction by the opposing surface 76*bb* and the surface of the first side plate portion 60*b* facing one side in the axial direction. The seal 70A seals between the first bus bar holder 76 and the first side plate portion 60*b*.

According to the present example embodiment, the first bus bar 75 extends to the inverter housing space 83 through the third through hole 60*bg* axially penetrating the first side plate portion 60*b*. Therefore, the first bus bar 75 is attached to the inverter housing portion 6*c* from one side in the axial direction. The motor 2 is not disposed on both axial sides of the inverter housing portion 6*c*. Therefore, according to the present example embodiment, it is easy to insert and assemble the first bus bar 75 into the third through hole 60*bg*.

According to the present example embodiment, the first bus bar 75 is connected to the coil wire 31*b* extending from the stator 30 at the end on one side in the axial direction of the stator 30 in the motor housing space 81. According to the present example embodiment, in the process of connecting the first bus bar 75 and the coil wire 31*b*, the inverter 8 and the motor 2 do not hinder the connection work, and the connection process can be facilitated.

According to the present example embodiment, the first bus bar holder 76 closes the opening of the third through hole 60*bg* and is inserted into the third through hole 60*bg*. The seal 70A seals between the first side plate portion 60*b* and the first bus bar holder 76 around the opening of the third through hole 60*bg*. Since the first bus bar assembly 70 includes the seal 70A, it is possible to suppress passage of dust or the like between the motor housing space 81 and the inverter housing space 83. Further, the seal 70A can suppress the oil stored in the motor housing space 81 and cooling the motor 2 from entering the inverter housing space 83 from the motor housing space 81.

The phrase "the first bus bar holder 76 closes the opening of the third through hole 60*bg*" means that the first bus bar holder 76 closes the opening of the third through hole 60*bg* in a sealable manner. For example, the first bus bar holder 76 may cover the periphery of the opening without being inserted into the third through hole 60*bg*, and the first bus bar holder 76 may be inserted into the third through hole 60*bg* to close the inner circumferential surface.

In addition, the seal 70A of the present example embodiment seals in the axial direction between the first side plate portion 60b of the peripheral edge of the third through hole 60bg and the first bus bar holder 76. According to the present example embodiment, the sealing performance can be easily exhibited by assembling the seal 70A together with the first bus bar holder 76 to the first side plate portion 60b from the axial direction. As the seal 70A, a sheet-like gasket, an O-ring, or the like can be adopted.

According to the present example embodiment, the first side plate portion 60b provided with the third through hole 60bg is a part of the housing body 60. As described above, by partitioning the housing space 80 into the motor housing space 81 and the inverter housing space 83 by a part of the housing body 60, the number of components constituting the housing 6 can be reduced and the entire structure can be simplified.

In the present example embodiment, the first bus bar assembly 70 is fixed to the first partition wall 60ba that partitions the motor housing portion 6a and the inverter housing portion 6c in the housing 6. The housing 6 includes the housing body 60 that houses and supports the motor 2, and the inverter housing 63 that houses the inverter 8 in a space facing and surrounding a part of the housing body 60. The first partition wall 60ba to which the first bus bar assembly 70 is fixed is a part of the first side plate portion 60b of the housing body 60.

According to the present example embodiment, the housing body 60 constitutes a part of the motor housing portion 6a and a part of the inverter housing portion 6c. That is, according to the present example embodiment, a part of the motor housing portion 6a and a part of the inverter housing portion 6c are formed of a single member in the inverter 8. Therefore, the entire motor assembly 1 can be reduced in size and weight.

According to the present example embodiment, the motor housing portion 6a and the inverter housing portion 6c are configured by the housing body 60. The first partition wall 60ba of the housing body 60 partitions the motor housing space 81 and the inverter housing space 83. Therefore, by providing the third through hole 60bg in the first partition wall 60ba and arranging the first bus bar assembly 70, the first bus bar 75 can be arranged across the motor housing space 81 and the inverter housing space 83. Thus, the stator 30 and the inverter 8 can be connected by the first bus bar 75 with a simple configuration.

According to the present example embodiment, the first bus bar assembly 70, the sensor connector 73, and the first connector 71 are arranged on the first side plate portion 60b of the first bus bar holder 76. Wirings extending from the first bus bar assembly 70, the sensor connector 73, and the first connector 71 toward the inverter 8 are housed in the inverter housing space 83. Wiring extending from the first bus bar assembly 70 and the sensor connector 73 toward the motor 2 and the inverter 8 is housed in the motor housing space 81. According to the present example embodiment, the wiring necessary for the motor assembly 1 can be arranged inside the housing 6, and not only the wiring of the entire motor assembly 1 can be simplified but also the wiring can be shortened as a whole.

The second bus bar assembly 77 includes a plurality of (three) second bus bars 78 and a second bus bar holder 79 that holds the plurality of second bus bars 78.

The second bus bar holder 79 is made of an insulating resin material. In the present example embodiment, the second bus bar holder 79 is made of a resin material different from that of the first bus bar holder 76. The resin material of the first bus bar holder 76 is preferably more excellent in oil resistance than the resin material of the second bus bar holder 79. The first bus bar holder 76 is accommodated in the motor housing space 81 and thus comes into contact with the oil O. Therefore, by selecting a material having excellent oil resistance as the resin material of the first bus bar holder 76, swelling and the like of the first bus bar holder 76 can be suppressed, and the gap between the first bus bar 75 and the first bus bar holder 76 can be suppressed from widening. As a result, the inflow of the oil O into the inverter housing space 83 through the gap between the first bus bar 75 and the first bus bar holder 76 can be suppressed. In addition, since the second bus bar holder 79 is disposed in the inverter housing space 83, contact with the oil O is restricted. Therefore, an appropriate resin material can be selected as the second bus bar holder 79 regardless of the oil resistance.

As the first bus bar holder 76, a polyphthal amide (PPA) resin or a polyphenylene sulfide (PPS) resin can be selected. As the second bus bar holder 79, a poly butylene terephthalate (PBT) resin can be selected.

The oil resistance may be evaluated by an immersion test in lubricating oil for automatic transmission. In this case, the oil resistance is evaluated by a weight change and a strength change after immersion for a predetermined time. The evaluation of the weight change includes the viewpoint of corrosion resistance and swelling.

The second bus bar 78 is made of a plate-shaped conductor. The three second bus bars 78 are connected to the U-phase first bus bar 75, the V-phase first bus bar 75, and the W-phase first bus bar 75, respectively. That is, the three second bus bars 78 are connected to the stator 30 via the first bus bars 75. The second bus bar 78 is connected to the inverter bus bar 8d of the inverter 8. That is, the second bus bar 78 relays and electrically connects the first bus bar 75 and the inverter 8. The second bus bar 78 supplies the alternating current output from the inverter 8 to the motor 2. The second bus bar 78 is disposed in the inverter housing space 83. The second bus bar 78 is fixed to the outer circumferential surface of the peripheral wall portion 60a of the housing body 60 via the second bus bar holder 79.

Here, as illustrated in FIG. 5, the outer circumferential surface of the peripheral wall portion 60a to which the second bus bar holder 79 is fixed is referred to as a first inner side surface 83a. The first inner side surface 83a faces the inverter housing space 83. The first inner side surface 83a is a surface extending along the outer circumferential surface of the motor 2.

In the present example embodiment, the second bus bar holder 79 is fixed in a state where a gap G1 is provided in the first inner side surface 83a. Since the first inner side surface 83a is a surface extending along the outer circumferential surface of the motor 2 in the housing body 60, it is easy to vibrate together with the motor 2. According to the present example embodiment, since the gap G1 is provided between the second bus bar holder 79 and the first inner side surface 83a, it is possible to suppress the vibration of the motor 2 from being transmitted to the second bus bar 78 and the second bus bar holder 79. As a result, damage to the second bus bar 78 and the second bus bar holder 79, loosening of the fastening portion, and the like can be suppressed.

As illustrated in FIG. 9, the second bus bar 78 includes an inverter-side terminal connection portion 78c connected to the inverter 8 and a motor-side terminal connection portion 78d connected to the first bus bar 75. In addition, the second bus bar 78 has a second bus bar body portion 78a extending in the vertical direction along the outer circumferential surface of the peripheral wall portion 60a of the housing body 60. The second bus bar body portions 78a of the three second bus bars 78 are arranged along the axial direction. The inverter-side terminal connection portion 78*c* is provided at an upper end portion of the second bus bar body portion 78*a*.

As illustrated in FIG. 5, the inverter-side terminal connection portion 78*c* is bent in the plate thickness direction of the second bus bar body portion 78*a*. The inverter-side terminal connection portion 78*c* extends along the horizontal direction. The second bus bar 78 is connected to the inverter bus bar 8*d* at the inverter-side terminal connection portion 78*c*. The inverter bus bar 8*d* and the inverter-side terminal connection portion 78*c* constitute the connection portion 8*j* between the inverter 8 and the second bus bar.

As described above, the inverter housing 63 is provided with the second window portion 632 that is located immediately above the connection portion 8*j* that electrically connects the inverter 8 and the second bus bar 78 and exposes the connection portion 8*j* between the inverter 8 and the second bus bar 78. The second bus bar 78 electrically connects the stator 30 and the inverter 8. According to the present example embodiment, it is possible to easily perform the step of electrically connecting the stator 30 and the inverter 8, which facilitates the access of the tool to the inverter housing space 83 via the second window portion 632.

The axial positions of the motor-side terminal connection portions 78*d* of the three second bus bars 78 coincide with each other. The two second bus bars 78 of the three second bus bars 78 have an extension portion 78*b* extending in the axial direction from the lower end portion of the second bus bar body portion 78*a* to the axial position of the motor-side terminal connection portion 78*d* of the remaining one second bus bar 78. As illustrated in FIG. 5, the three second bus bars 78 extend along the first inner side surface 83*a* in the second bus bar body portion 78*a* and the extension portion 78*b*.

Figure 10:
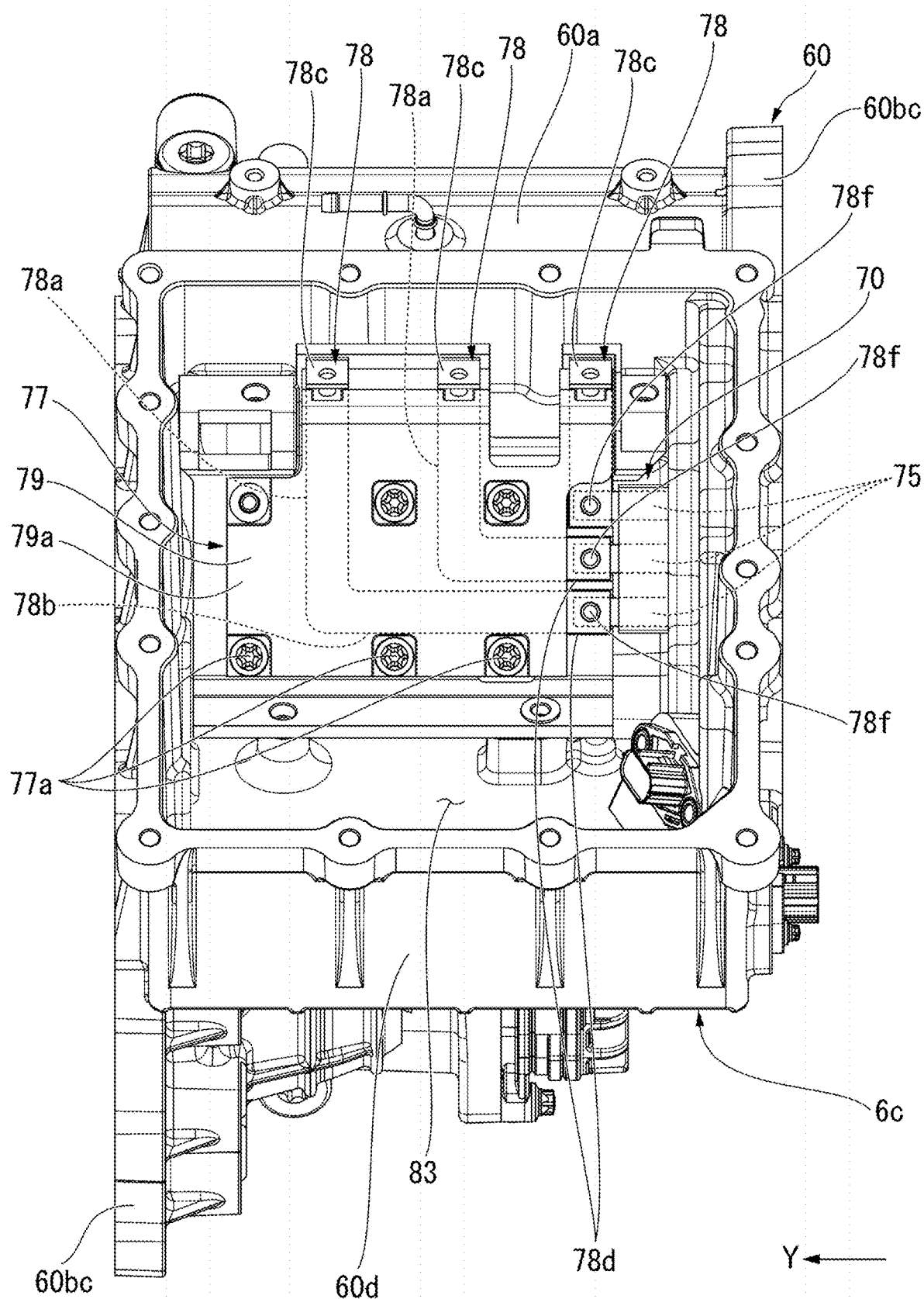
FIG. 10 is a front view of a second bus bar assembly disposed in an inverter housing space in a motor assembly according to an example embodiment of the present disclosure.

FIG. 10 is a front view of the second bus bar assembly 77 disposed in the inverter housing space 83.

As described above, the end on the other side (+Y side) in the axial direction of the first bus bar 75 is disposed inside the inverter housing space 83 through the third through hole 60*bg*. The motor-side terminal connection portion 78*d* of the second bus bar 78 is connected to the end on the other side in the axial direction of the first bus bar 75 inside the inverter housing space 83.

More specifically, the end on the other side in the axial direction of the first bus bar 75 and the motor-side terminal connection portion 78*d* of the second bus bar 78 are stacked on each other in the plate thickness direction. In addition, through holes overlapping each other are provided at the mutually stacked ends of the first bus bar 75 and the second bus bar 78. A connection screw 78*f* is inserted into the through hole. The first bus bar 75 and the second bus bar 78 are fastened and connected to each other by a connection screw 78*f* and a nut (not illustrated).

As illustrated in FIG. 5, the second bus bar holder 79 includes a base member 79*b* and a cover member 79*a*. The base member 79*b* and the cover member 79*a* are made of an insulating material. In the present example embodiment, the base member 79*b* and the cover member 79*a* are made of a resin material.

The base member 79*b* has a plate shape extending along the outer circumferential surface of the peripheral wall portion 60*a*. The base member 79*b* is fixed to the outer circumferential surface of the peripheral wall portion 60*a* inside the inverter housing space 83. The cover member 79*a* has a plate shape that covers the upper surface of the base member 79*b*. The cover member 79*a* is fixed to the base member 79*b*. In addition, the second bus bar body portion 78*a* and the extension portion 78*b* of the second bus bar 78 are sandwiched between the cover member 79*a* and the base member 79*b*. That is, the second bus bar holder 79 supports the second bus bar 78 by sandwiching the second bus bar 78 between the base member 79*b* and the cover member 79*a*.

According to the present example embodiment, the second bus bar 78 responsible for a part of the wiring from the stator 30 to the inverter 8 is arranged inside the inverter housing space 83. In addition, the second bus bar 78 extends from a motor-side connection terminal 79*d* to an inverter-side connection terminal 79*c* located immediately below the second window portion 632 and is connected to the inverter 8. According to the present example embodiment, since the second bus bar 78 is provided inside the inverter housing space 83, it is possible to facilitate connection of wiring between the stator 30 and the inverter 8.

According to the present example embodiment, the second bus bar 78 extends along the first inner side surface 83*a* of the inverter housing space 83. As a result, it is possible to suppress the second bus bar 78 from compressing the volume of the inverter housing space 83, and the volume of the inverter housing space 83 can be efficiently used.

In the present example embodiment, the inner surface along which the second bus bar 78 extends is the first inner side surface 83*a* extending along the outer circumferential surface of the motor 2, but may be another inner surface as long as it faces the inverter housing space 83. However, as shown in the present example embodiment, when the second bus bar 78 is disposed along the first inner side surface 83*a*, the total length of the second bus bar 78 can be easily shortened, and the electric resistance of the second bus bar 78 can be suppressed. In particular, in the present example embodiment, since the longitudinal direction of the switching element 8A of the inverter 8 is the axial direction, the three connection portions 8*j* of the second bus bar 78 and the inverter bus bar 8*d* are arranged side by side in the axial direction. In such a structure, it is easy to shorten the entire length of the second bus bar 78 by arranging the second bus bar 78 along the outer circumferential surface of the motor 2.

Figure 11:
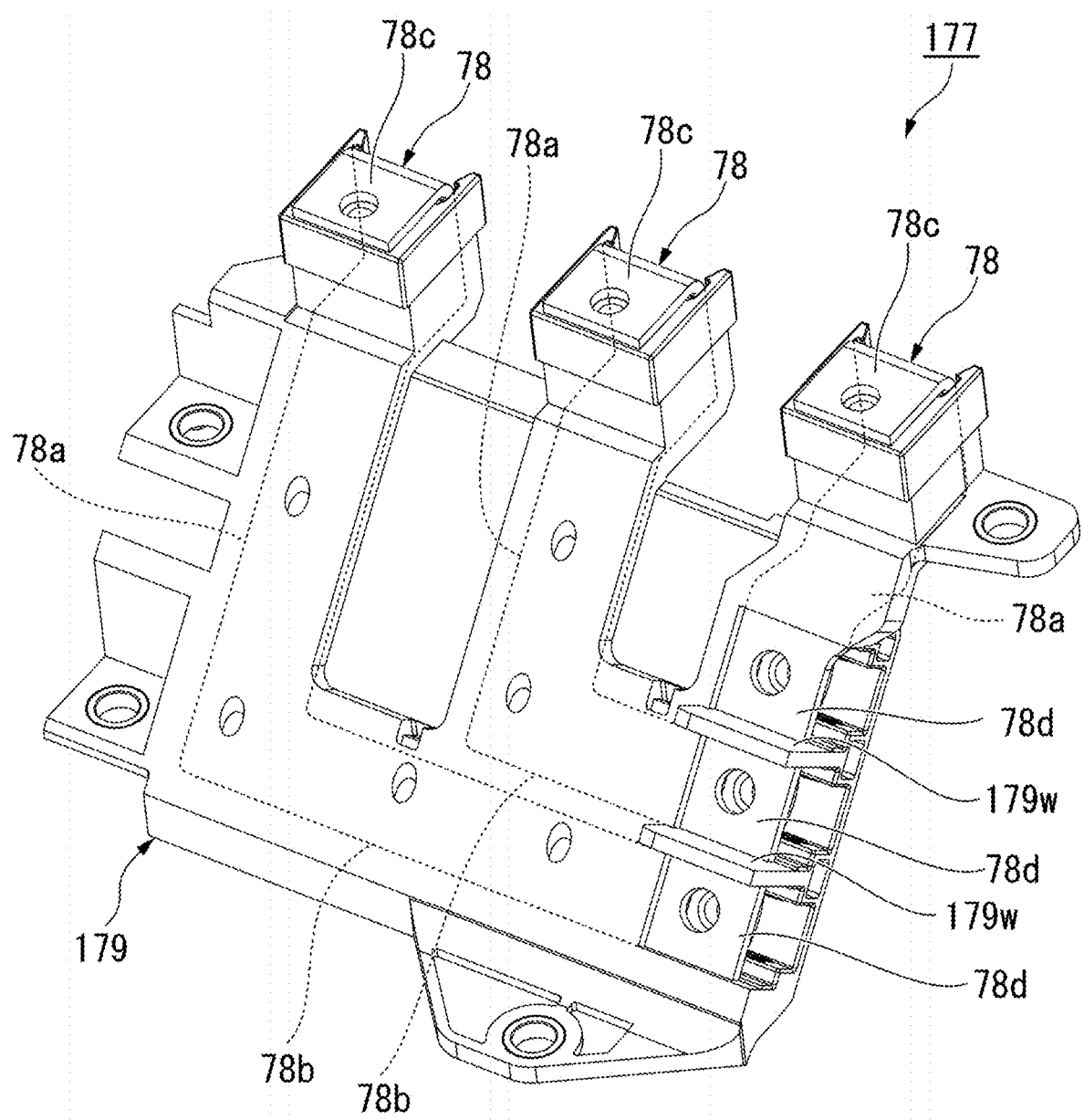
FIG. 11 is a perspective view of a second bus bar assembly of a first modification of an example embodiment of the present disclosure.

FIG. 11 is a perspective view of a second bus bar assembly 177 of a first modification which can be employed in the present example embodiment. Note that members or portions that have their equivalents in the above-described example embodiment are denoted by the same reference numerals as those of their equivalents in the above-described example embodiment, and descriptions of those members or portions are omitted.

The second bus bar assembly 177 includes three second bus bars 78 and a second bus bar holder 179 that holds the three second bus bars 78. The second bus bar holder 179 is made of an insulating resin material. In the present modification, the three second bus bars 78 are embedded in the second bus bar holder 179 by insert molding.

The second bus bar 78 is embedded in the second bus bar holder 179 in the second bus bar body portion 78*a* and the extension portion 78*b*. The second bus bar 78 is exposed from the second bus bar holder 179 at the motor-side terminal connection portion 78*d* and the inverter-side terminal connection portion 78*c*.

The axial positions of the three motor-side terminal connection portions 78*d* coincide with each other. The three motor-side terminal connection portions 78*d* are arranged side by side.

The second bus bar holder 179 includes a partition wall portion 179w located between the motor-side terminal connection portions 78d. The partition wall portion 179w is disposed between the pair of motor-side terminal connection portions 78d. Since the second bus bar assembly 177 of the present modification is provided with the three motor-side terminal connection portions 78d, the second bus bar holder 179 has two partition wall portions 179w located therebetween.

The partition wall portion 179w protrudes in the plate thickness direction of the second bus bar 78. According to the present modification, the creepage distance between the motor-side terminal connection portions 78d adjacent to each other can be increased. This makes it possible to secure the insulation performance of the second bus bar assembly 177 while reducing the size of the second bus bar assembly 177 by bringing the motor-side terminal connection portions 78d close to each other.

The positions of the three inverter-side terminal connection portions 78c in the vertical direction coincide with each other. Further, the three inverter-side terminal connection portions 78c are arranged side by side. The inverter-side terminal connection portions 78c are disposed at a distance from the motor-side terminal connection portions 78d. Similarly to the above-described example embodiment illustrated in FIG. 5, also in the present modification, the inverter-side terminal connection portion 78c is connected to the inverter 8 by inserting a tool from the second window portion 632 (see FIG. 5) of the inverter housing 63. For this reason, in a case where the inverter-side terminal connection portions 78c are disposed close to each other, there is a possibility that the step of connecting the inverter-side terminal connection portions 78c becomes complicated. According to the present example embodiment, since the inverter-side terminal connection portions 78c are disposed sufficiently apart from each other, the step of connecting the inverter-side terminal connection portion 78c and the inverter 8 can be facilitated. In addition, by disposing the inverter-side terminal connection portions 78c sufficiently apart from each other, it is possible to sufficiently secure insulation performance between the inverter-side terminal connection portions 78c without providing a partition wall portion or the like.

Figure 12:
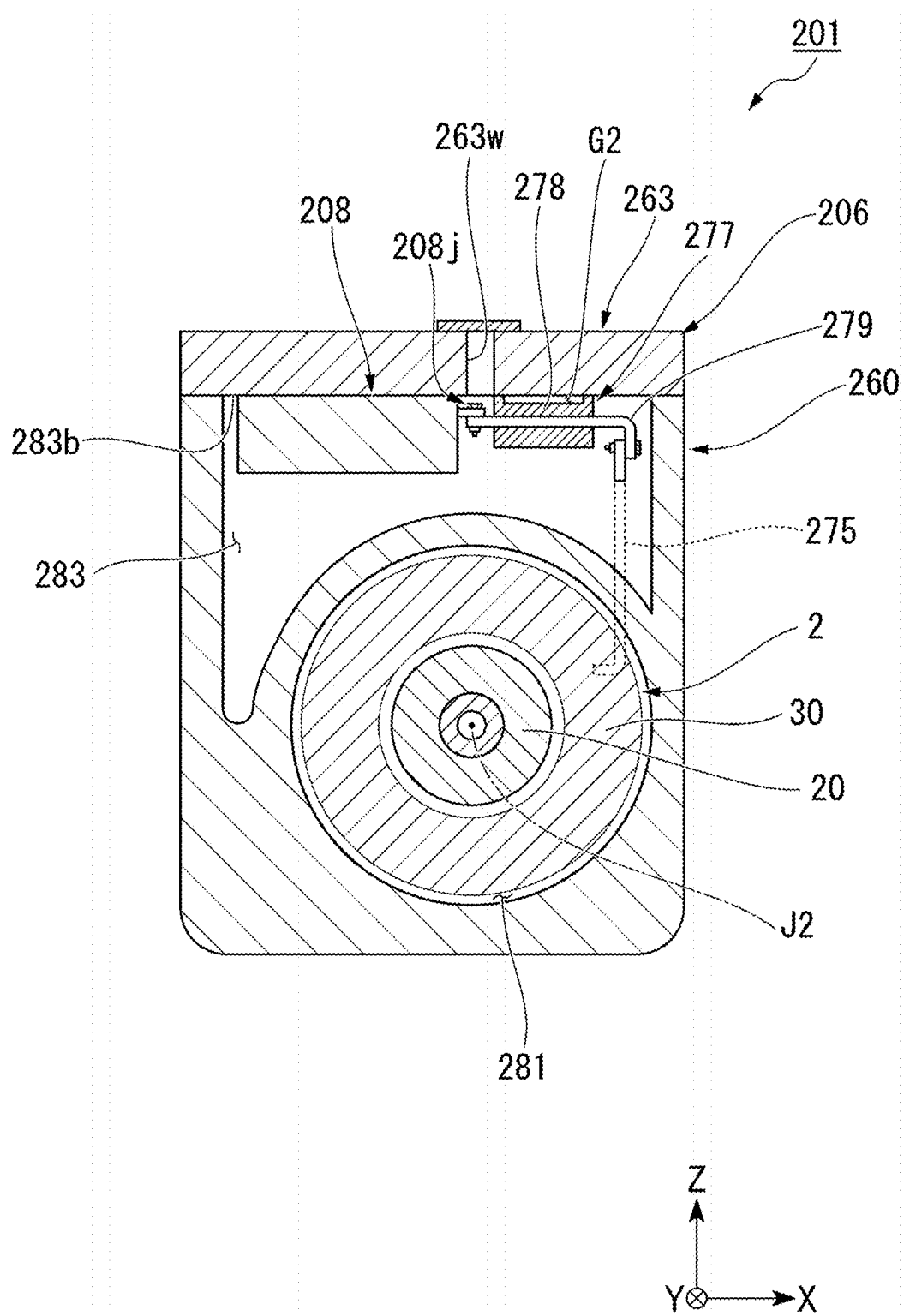
FIG. 12 is a schematic cross-sectional view of a motor assembly of a second modification of an example embodiment of the present disclosure.
Figure 13:
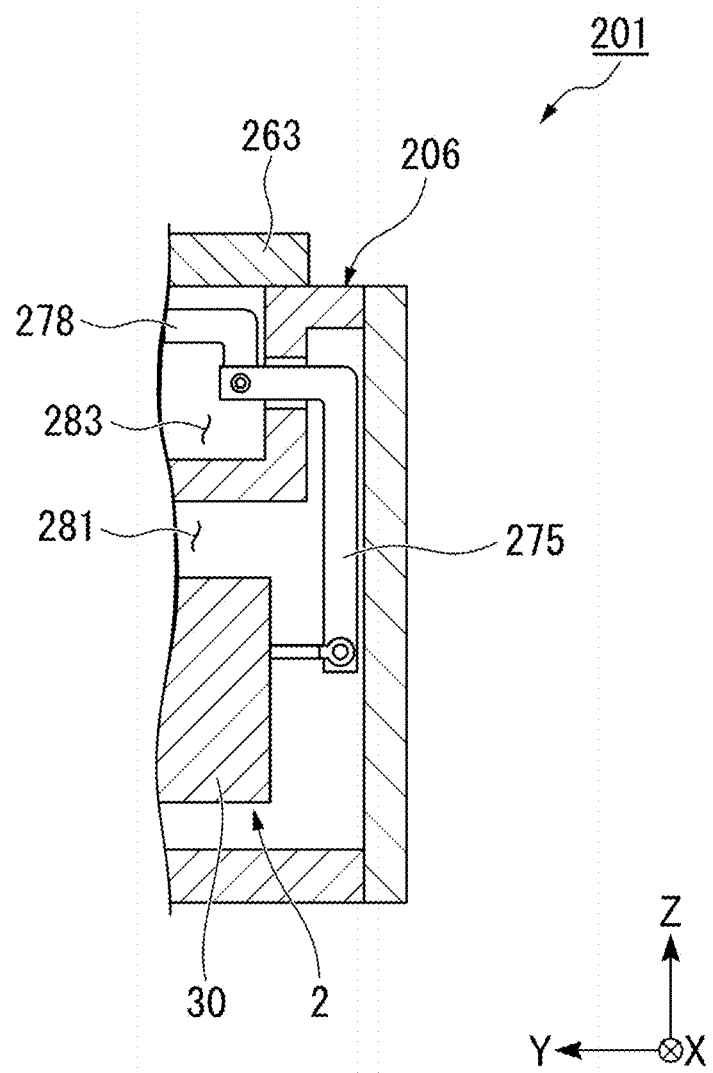
FIG. 13 is a schematic cross-sectional view of a motor assembly of the second modification.

FIGS. 12 and 13 are schematic cross-sectional views of a second bus bar assembly 277 according to a second modification that can be employed in the present example embodiment and a motor assembly 201 including the second bus bar assembly 277. Note that members or portions that have their equivalents in the above-described example embodiment are denoted by the same reference numerals as those of their equivalents in the above-described example embodiment, and descriptions of those members or portions are omitted.

As in the above-described example embodiment, the housing 206 of the motor assembly 201 includes a housing body 260 and an inverter housing 263. A motor housing space 281 is provided inside the housing body 260. The housing body 260 and the inverter housing 263 surround the inverter housing space 283. The inverter housing space 283 houses an inverter 208 and the second bus bar assembly 277.

The second bus bar assembly 277 has a second bus bar 278, and a second bus bar holder 279 that holds the second bus bar 278.

The second bus bar holder 279 is made of an insulating resin material. Note that the second bus bar assembly 277 includes a plurality of (for example, three) second bus bars 278, but only one is illustrated in FIGS. 12 and 13 for simplicity.

The second bus bar 278 is connected to the motor 2 via a first bus bar 275. In addition, the second bus bar 278 is connected to the inverter 208 at a connection portion 208j. That is, the second bus bar 278 electrically connects the motor 2 and the inverter 208 together with the first bus bar 275. Note that the connection portion 208j is located immediately below a window portion 263w provided in the inverter housing 263.

The inverter 208 and the second bus bar assembly 277 are fixed to the lower surface of the inverter housing 263. Here, the lower surface of the inverter housing 263 to which the inverter 208 and the second bus bar assembly 277 are fixed is referred to as a second inner side surface 283b. The second inner side surface 283b faces the inverter housing space 283.

The second bus bar 278 extends along the second inner side surface 283b of the inverter housing space 283. As a result, it is possible to suppress the second bus bar 278 from compressing the volume of the inverter housing space 283, and the volume of the inverter housing space 283 can be efficiently used.

As illustrated in the above-described example embodiment and the present modification, such an effect can be obtained as long as the second bus bars 78 and 278 extend along at least one of the first inner side surface 83a (see FIG. 5) facing the inverter housing space 83 in the housing body 260 and the second inner side surface 283b (FIG. 12) facing the inverter housing space 283 in the inverter housing 263. The second inner side surface 283b of the present modification may be any surface as long as the surface faces the inverter housing space 283.

In the present modification, the second bus bar holder 279 is fixed in a state where a gap G2 is provided in the second inner side surface 283b. According to the present modification, since the gap G2 is provided between the second bus bar holder 279 and the second inner side surface 283b, the vibration of the inverter 208 can be suppressed from being transmitted to the second bus bar 278 and the second bus bar holder 279. As a result, damage to the second bus bar 278 and the second bus bar holder 279, loosening of the fastening portion, and the like can be suppressed.

As described in the above-described example embodiment and the present modification, when the second bus bar holders 79 and 279 are fixed in a state where a gap is provided in at least one of the first inner side surface 83a and the second inner side surface 283b, the above-described effect on vibration can be obtained.

As illustrated in FIG. 1, the oil O circulates in an oil passage 90 provided in the housing 6. The oil passage 90 is a path of the oil O for supplying the oil O from the oil pool P to the motor 2. The oil passage 90 circulates the oil O to cool the motor 2.

The oil O is used for lubricating the reduction gear 4, the differential 5, and the bearings. In addition, the oil O is also used to cool the motor 2. The oil O accumulates in a lower region in the gear housing space 82, that is, the oil pool P. An oil equivalent to a lubricating oil (ATF: Automatic Transmission Fluid) for an automatic transmission having a low viscosity is preferably used as the oil O so that the oil O can perform functions of a lubricating oil and a cooling oil.

As illustrated in FIG. 1, the oil passage 90 is provided in the housing 6. The oil passage 90 is located in the housing space 80 in the housing 6. The oil passage 90 is formed across the motor housing space 81 and the gear housing space 82 of the housing space 80. The oil passage 90 is a path of the oil O that guides the oil O from the oil pool P (that is, a lower region in the housing space 80) on the lower side of the motor 2 to the oil pool P on the lower side of the motor 2 again via the motor 2.

Note that, in the present specification, the term "oil passage" refers to a path along with the oil O circulates in the housing space 80. Therefore, the "oil passage" is a concept that includes not only a "flow passage", in which a steady flow of oil steadily traveling in one direction is formed, but also a path (e.g., a reservoir) in which oil is allowed to temporarily stay, and a path along which oil drips.

The oil passage 90 includes a first oil passage 91, which is arranged to pass through an inside of the motor 2, and a second oil passage (i.e., an oil passage) 92, which is arranged to pass through an outside of the motor 2. Each of the first oil passage 91 and the second oil passage 92 is arranged to circulate the oil O in the interior of the housing 6. The oil O cools the motor 2 from the inside and the outside through the first oil passage 91 and the second oil passage 92.

The first oil passage 91 includes a scraping-up channel 91*a*, a shaft feed channel 91*b*, an intra-shaft channel 91*c*, and an intra-rotor channel 91*d*. In addition, a first reservoir 93 is arranged in the channel of the first oil passage 91. The first reservoir 93 is provided in the gear housing space 82.

The second oil passage 92 includes a first flow passage 92*a*, a second flow passage 92*b*, a third flow passage 92*c*, and a fourth flow passage 92*d*. A pump 96, the cooler 97, and a second reservoir 98 are arranged in a path of the second oil passage 92.

The first flow passage 92*a*, the second flow passage 92*b*, and the third flow passage 92*c*, and the fourth flow passage 92*d* are arranged to pass the wall portion of the housing 6, which is arranged to surround the housing space 80.

The pump 96 is an electric pump driven by electricity. The oil pump 96 is arranged to suck the oil O from the oil pool P through the first flow passage 92*a*, and to feed the oil O to the motor 2 through the second flow passage 92*b*, the cooler 97, the third flow passage 92*c*, the fourth flow passage 92*d*, and the second reservoir 98. That is, the pump 96 is provided to circulate the oil O in the second oil passage 92.

In addition, a suction inlet 96*a* of the pump 96 is connected to the first flow passage 92*a*. A discharge port 96*b* of the pump 96 is connected to the second flow passage 92*b*.

The pump 96 has a second connector 72 that is a part of the wiring. The wiring of the pump 96 passes through the wiring outside the housing body from the second connector 72 and is connected to the first connector 71. Then, the first connector 71 is connected to the inverter 8 via wiring inside the inverter housing portion 6*c*.

The cooler 97 has a contact surface 97*a* that comes into contact with the outer circumferential surface of the motor housing portion 6*a*. The second flow passage 92*b* passes through the inside of the wall portion of the motor housing portion 6*a*. The third flow passage 92*c* passes through the inside of the wall portion of the motor housing portion 6*a*. The fourth flow passage 92*d* passes through the inside of the wall portion of the motor housing portion 6*a*.

Figure 14:
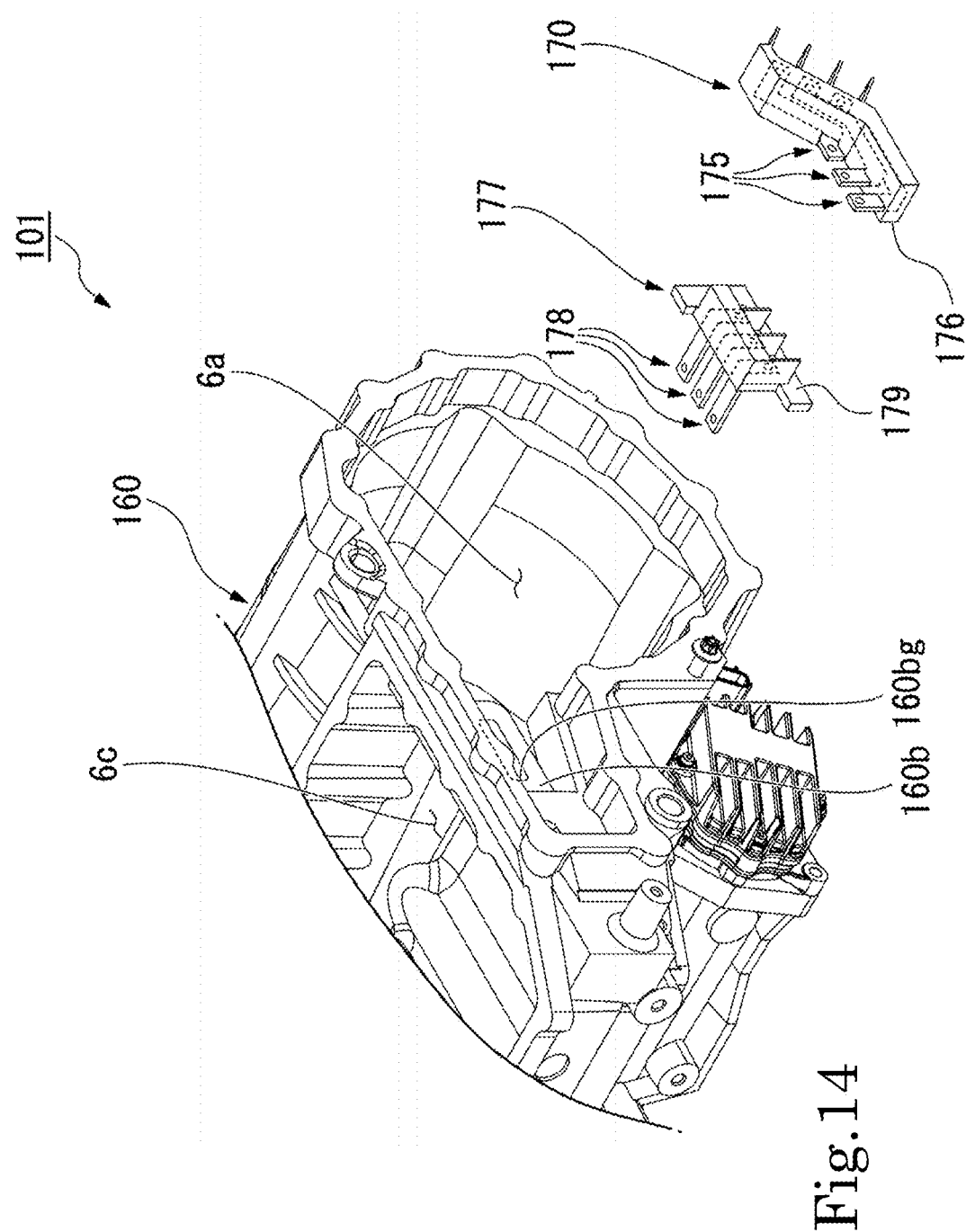
FIG. 14 is an exploded perspective view of a housing and a bus bar assembly of a third modification of an example embodiment of the present disclosure.

FIG. 14 illustrates a housing 106 and a bus bar assembly 170 according to a modification that can be employed in the above-described example embodiment. Note that members or portions that have their equivalents in the above-described example embodiment are denoted by the same reference numerals as those of their equivalents in the above-described example embodiment, and descriptions of those members or portions are omitted.

As in the above-described example embodiment, the housing 106 includes a motor housing portion 106*a* in which the motor housing space 81 is provided, and an inverter housing portion 106*c* in which the inverter housing space 83 is provided. The inverter housing portion 106*c* has a first side plate portion 160*b* which is located on one side (−Y side) in the axial direction of the inverter 8 (not illustrated in FIG. 14) and provided with a third through hole 160*bg* penetrating in the axial direction.

The bus bar assembly 170 includes a first unit 170A and a second unit 170B. The first unit 170A is attached to the coil wire 31*b* extending from the stator 30 (not illustrated in FIG. 14). On the other hand, the second unit 170B is fixed to the first side plate portion 160*b* of a housing body 160. The first unit 170A is assembled to the housing body 160 together with the stator 30. The first unit 170A is disposed on one side (−Y side) in the axial direction of the second unit 170B and connected to the second unit 170B.

The first unit 170A includes three motor-side bus bars 175 and a first bus bar holder 176 that supports the three motor-side bus bars 175. The second unit 170B includes three inverter-side bus bars 178 and the second bus bar holder 179 that supports the three inverter-side bus bars 178.

The motor-side bus bar 175 is embedded in the first bus bar holder 176. Both ends of the motor-side bus bar 175 are exposed from the first bus bar holder 176. One end of the motor-side bus bar 175 is connected to the coil wire 31*b* extending from the stator 30. The other end of the motor-side bus bar 175 is connected to the inverter-side bus bar 178. The first bus bar holder 176 is made of an insulating material. The first bus bar holder 176 is fixed to the second bus bar holder 179.

The inverter-side bus bar 178 is embedded in the second bus bar holder 179. Both ends of the inverter-side bus bar 178 are exposed from the second bus bar holder 179. One end of the inverter-side bus bar 178 is connected to the motor-side bus bar 175. The other end of the inverter-side bus bar 178 passes through the third through hole 160*bg*, is introduced into the inverter housing portion 106*c*, and is connected to the inverter 8 (not illustrated in FIG. 14). The inverter is connected to the inverter-side bus bar 178. The first bus bar holder 176 is made of an insulating material. The first bus bar holder 176 is fixed to the first side plate portion 160*b*. The first bus bar holder 176 and the third through hole 160*bg* are sealed by a seal (not illustrated).

The motor-side bus bar 175 and the inverter-side bus bar 178 of the present modification are connected to each other, and function as the first bus bar 75 in the above-described example embodiment. According to the present modification, since the motor-side bus bar 175 and the inverter-side bus bar 178 are separate members, one can be attached to the stator 30 in advance, and the other can be attached to the housing body 160 in advance for assembly. Therefore, the final assembling process can be simplified.

As illustrated in FIG. 14, the inverter housing portion 106*c* of the housing body 160 is provided with a cooling water passage 108*b*. In addition, the cooling water passage 108*b* has an introduction port 108*ba* and a discharge port 108*bb* that are open to one side in the axial direction. In the above-described example embodiment, the cooling water passage 8*b* is provided in the inverter housing 63. However, as shown in the present modification, the cooling water passage 108*b* may be provided in the housing body 160.

While an example embodiment of the present disclosure and modifications thereof have been described above, it will be understood that features, a combination of the features, and so on according to the example embodiment are only illustrative and not restrictive, and that an addition, elimination, and substitution of a feature(s), and other modifications can be made without departing from the scope and spirit of the present disclosure. Also note that the present disclosure is not limited by the example embodiment.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor assembly comprising:
a motor that includes a rotor rotatable about a motor shaft and a stator radially outside the rotor;
an inverter to supply power to the motor;
a housing that is provided with a motor housing space to house the motor and an inverter housing space to house the inverter;
a first bus bar that electrically connects the motor and the inverter; and
second bus bars that electrically connect the first bus bar and the inverter; wherein
the housing includes a partition wall portion that partitions the motor housing space and the inverter housing space and is provided with a through hole penetrating in an axial direction;
the first bus bar is connected to a coil wire extending from the stator at an end on one side in an axial direction of the stator in the motor housing space, and extends to the inverter housing space through the through hole;
each of the second bus bars includes:
a motor-side terminal connection portion that is connected to the first bus bar; and
an inverter-side terminal connection portion that is connected to the inverter;
the second bus bars further include:
body portions extending in a direction which at least partially passes through or along a circumferential direction of the motor assembly to be connected to the inverter-side terminal connection portions; and
extension portions which extend in an axial direction of the motor assembly from a lower end portion of the body portions to an axial position of the motor-side terminal connection portions;
the body portions are arranged side by side along the axial direction; and
the extension portions are arranged side by side along the direction which at least partially passes through or along the circumferential direction.

2. The motor assembly according to claim 1, comprising:
a first bus bar holder that holds the first bus bar; and
a seal; wherein
oil to cool the motor is stored in the motor housing space;
the first bus bar holder closes an opening of the through hole; and
the seal seals between the partition wall portion and the first bus bar holder around the opening of the through hole.

3. The motor assembly according to claim 1, wherein the housing includes:
a housing body that houses the motor; and
an inverter housing to which the inverter is fixed;
the housing body and the inverter housing oppose each other;
the inverter housing space is surrounded by the housing body and the inverter housing; and
the partition wall portion is a portion of the housing body.

4. The motor assembly according to claim 3, wherein the second bus bars extend along at least one of a first inner side surface opposing the inverter housing space in the housing body and a second inner side surface opposing the inverter housing space in the inverter housing.

5. The motor assembly according to claim 4, wherein the inverter housing includes a window portion immediately above a connection portion that electrically connects the inverter and the second bus bars.

6. The motor assembly according to claim 5, further comprising:
a second bus bar holder that holds the second bus bars; wherein
the first inner side surface extends along an outer circumferential surface of the motor; and
the second bus bar holder is fixed with a gap provided in at least one of the first inner side surface and the second inner side surface.

7. The motor assembly according to claim 4, further comprising:
a second bus bar holder that holds the second bus bars; wherein
a plurality of the motor-side terminal connection portions are arranged side by side; and
the second bus bar holder includes a partition wall portion located between the plurality of motor-side terminal connection portions.

8. The motor assembly according to claim 7, wherein a plurality of the inverter-side terminal connection portions are arranged side by side; and
the plurality of inverter-side terminal connection portions are spaced apart from each other as compared to the plurality of motor-side terminal connection portions.

9. The motor assembly according to claim 1, wherein the inverter includes a switch, a capacitor, and a power substrate; and
the switch has a rectangular shape when viewed from one direction, and is arranged with the axial direction of the motor assembly corresponding to a longitudinal direction of the rectangular shape of the switch.

* * * * *